(12) United States Patent
Modell et al.

(10) Patent No.: US 6,264,844 B1
(45) Date of Patent: Jul. 24, 2001

(54) SUPERCRITICAL WATER OXIDATION PROCESS AND APPARATUS OF ORGANICS WITH INORGANICS

(75) Inventors: Michael Modell, Cambridge; Evan F. Kuharich, Holliston; Michael R. Rooney, Upton, all of MA (US)

(73) Assignee: Modell Environmental Corporation, Cambridge, MA (US)

( * ) Notice: Subject to any disclaimer, the term of this patent is extended or adjusted under 35 U.S.C. 154(b) by 0 days.

(21) Appl. No.: 08/134,204

(22) Filed: Oct. 8, 1993

Related U.S. Application Data

(62) Division of application No. 07/722,979, filed on Jun. 28, 1991, now Pat. No. 5,252,224.

(51) Int. Cl.[7] .................................................... C02F 11/08
(52) U.S. Cl. .......................... 210/696; 210/761; 210/175; 210/909
(58) Field of Search ..................................... 210/761, 762, 210/758, 695, 696, 908, 909, 175

(56) References Cited

U.S. PATENT DOCUMENTS

| | | | |
|---|---|---|---|
| 3,876,497 | 4/1975 | Hoffman | 162/189 |
| 3,876,536 | 4/1975 | Pradt et al. | 210/10 |
| 3,977,966 | 8/1976 | Pradt et al. | 210/17 |
| 4,042,502 | * 8/1977 | Schmidt et al. . | |
| 4,100,730 | 7/1978 | Pradt | 60/39.05 |
| 4,113,446 | 9/1978 | Modell et al. | 48/202 |
| 4,141,829 | 2/1979 | Thiel et al. | 210/63 |
| 4,174,280 | 11/1979 | Pradt et al. | 210/60 |
| 4,241,722 | 12/1980 | Dickinson | 126/263 |
| 4,284,015 | 8/1981 | Dickinson | 110/347 |
| 4,292,953 | 10/1981 | Dickinson | 126/263 |

(List continued on next page.)

FOREIGN PATENT DOCUMENTS

| | | |
|---|---|---|
| 0480474 A1 | 4/1992 | (EP) . |
| 81/03169 | 11/1981 | (WO) . |
| WO89/08614 | * 9/1989 | (WO) .................................. 210/762 |

OTHER PUBLICATIONS

Bramlette, et al., Sandia Report (SAND90–8229), "Destruction of DOE/DP Surrogate Wastes with Supercritical Water Oxidation Technology," (Nov. 1990).

Ermolaev, N.P., et al., "Pipe Inner Surface Scale Sample Remover—has Washing Soln. Vessel Connected to Shaft with Brush, by Flexible Pipeline," (From Derwent Publications Ltd., London, GB, Week 8350, Section EI, Feb. 25, 1983, Abstract SU–996908).

*Primary Examiner*—Chester T. Barry
(74) *Attorney, Agent, or Firm*—Hamilton, Brook, Smith & Reynolds, P.C.

(57) ABSTRACT

A method and apparatus is disclosed for oxidation of aqueous mixtures of organic material, including toxic material in the presence of inorganic materials, by reaction of said material with water and oxygen at supercritical conditions. Oxygen and the aqueous mixture are separately pressurized to greater than about 218 atmospheres, combined to form a reaction mixture and then directed through a tubular reactor having a substantially constant internal diameter. The velocity of the reaction mixture is sufficient to prevent settling of a substantial portion of solids initially present in the reaction mixture and of solids which form during passage through the reactor. The mixture is heated to temperature above about 374° C. in the tubular reactor. A substantial portion of the organic material in the reaction mixture is oxidized in the tubular reactor to thereby form an effluent mixture. Inorganic salts in the effluenet mixture, which are insoluble at conditions of supercritical temperature and pressure for water, are dissolved in a liquid water phase during cooldown of the effluent mixture at an outlet end of the reactor. Inorganic solids that are not soluble in the effluent mixture can be separated from a substantial portion of the effluent mixture by filtration prior to subsequent depressurization of the effluent mixture.

9 Claims, 11 Drawing Sheets

U.S. PATENT DOCUMENTS

| | | | |
|---|---|---|---|
| 4,338,199 | 7/1982 | Modell | 210/721 |
| 4,543,190 | 9/1985 | Modell | 210/721 |
| 4,564,458 | 1/1986 | Burleson | 210/747 |
| 4,635,711 * | 1/1987 | Clark et al. . | |
| 4,692,252 | 9/1987 | Atwood et al. | 210/761 |
| 4,713,177 | 12/1987 | Atwood et al. | 210/697 |
| 4,822,497 | 4/1989 | Hong et al. | 210/721 |
| 4,869,833 | 9/1989 | Binning et al. | 210/761 |
| 4,877,519 * | 10/1989 | Robey . | |
| 5,100,560 | 3/1992 | Huang | 210/721 |
| 5,133,877 | 7/1992 | Rofer et al. | 210/761 |
| 5,158,689 * | 10/1992 | Ishii et al. | 210/762 |
| 5,417,937 * | 5/1995 | Voigt et al. . | |
| B1 4,338,199 | 11/1988 | Modell | 210/721 |

\* cited by examiner

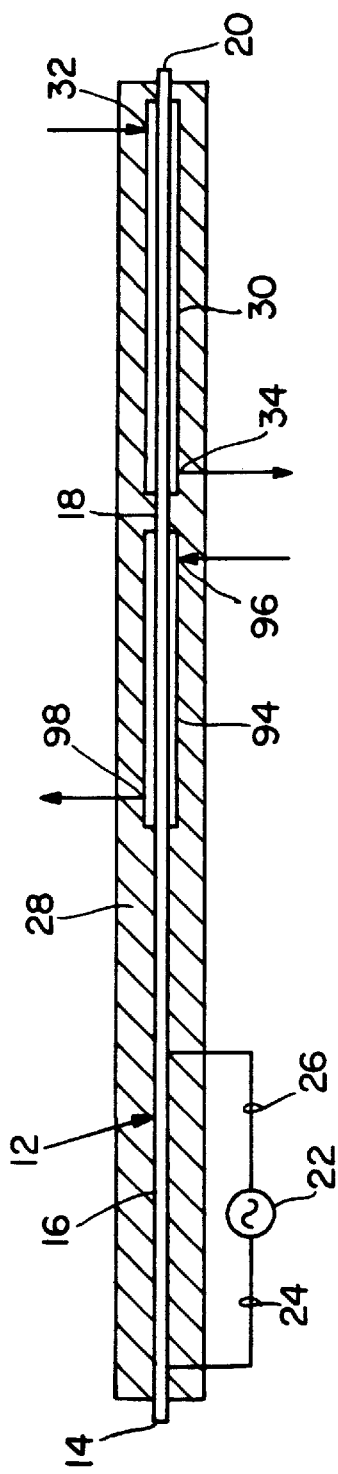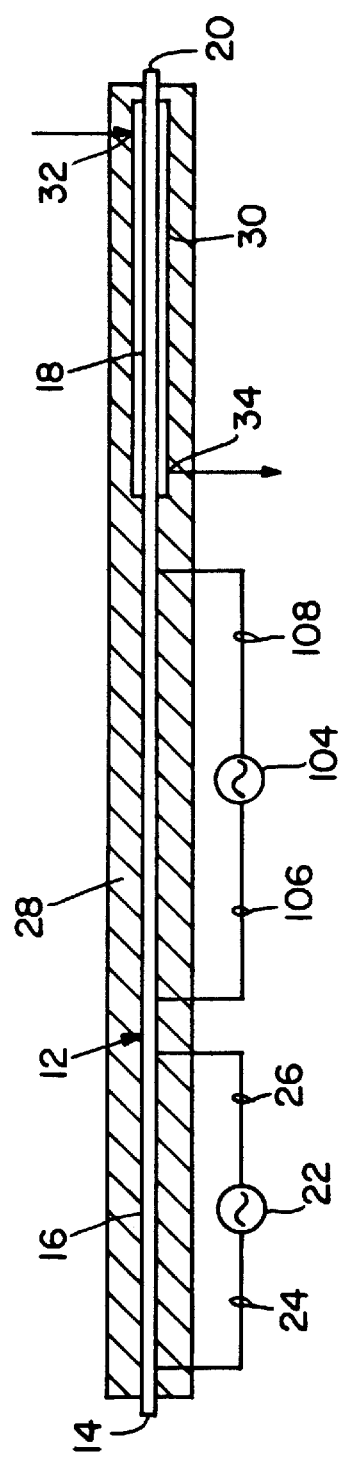
FIG. 3A
FIG. 3B

SUPERCRITICAL WATER OXIDATION PROCESS AND APPARATUS OF ORGANICS WITH INORGANICS

This division, of application Ser. No. 07/722,979 filed on Jun. 28, 1991 U.S. Pat. No. 5,252,224.

BACKGROUND OF THE INVENTION

Disposal of chemical wastes has been a problem because of space limitations, contamination of natural resources and considerable financial burden to industries and communities generating such wastes. A large fraction of wastes which must be disposed of are aqueous solutions, including sludges and slurries, which pose problems of weight and volume, thus being expensive to transport and difficult to contain over long periods of time.

Common disposal methods of wastes, such as sludges and other dilute aqueous wastes, include landfilling, deep well injection and incineration. Neither landfilling nor deep well injection eliminates these materials. Incineration is often limited to relatively concentrated aqueous wastes and can release harmful, partially oxidized, reaction products.

Oxidation of wastes by reaction of organic materials and oxygen in the presence of water at high temperature and pressure is an alternative method of disposal. One such method is the Zimmerman wet air oxidation process. See, for example, Wilhelmi et al., "Wet Air Oxidation-An Alternative to Incineration," *Chem. Eng. Prog.,* 75: 46–52 (1979). In the Zimmerman process, a two-phase feed mixture, including waste material, water aid air, is pressurized by an air compressor and a light pressure pump, and then heated in a feed/product heat exchanger. The pressurized and heated feed mixture is then passed through a reactor where the temperature is sufficient to partially oxidize the waste-material by reaction with oxygen. An effluent mixture is removed from the reactor and directed through the heat exchanger for cooldown and for transfer of heat from the effluent to the feed mixture. The heat exchanger is either a tube-and-shell or a tube-in-tube regenerative-type heat exchanger.

Another method for oxidation of organic material includes reaction with oxygen at supercritical conditions for water. See, for example, Thomason et al., "Supercritical Water Destruction of Aqueous Wastes," *Hazardous Waste* 1: 453–467 (1984). In this process, a dilute aqueous waste is heated in a counter-current heat exchanger and mixed with pressurized air to form a feed mixture. The feed mixture is then passed through an oxidizer, wherein the organic material is oxidized at a temperature and pressure in excess of the supercritical point for water. Inorganic solids, that may have been present in the feed, and inorganic salts, that may have formed as a solid precipitate in the oxidizer, are separated out at elevated temperature. One process teaches removal of such inorganic solids in a cyclone which receives the reactor effluent. See, for example, U.S. Pat. No. 4,338,199. However, such embodiments have been known to become clogged as a result of buildup of solids on reactor and cyclone walls. See, for example, MODAR, Inc. "Supercritical Water Oxidation: Gravity Independent Solids Separation." Final Report to NASA for the Period May 1, 1987 to Apr. 30, 1988 under Contract NAS2-12176; Stone & Webster Engineering Corporation. "Assessment and Development of an Industrial Wet Oxidation System for Burning Waste and Low-Grade Fuels." Report No. DOE/ID/12711-1 to the Department of Energy for Work Performed under Contract No. DE-FC07-88ID12711. Another process uses a large vessel reactor which provides a somewhat quiescent environment in which solid particulate fall to the bottom of the vessel (U.S. Pat. No. 4,822,497). The bottom of the vessel is maintained below the supercritical temperature so that some water will condense and form a pool of concentrated brine by dissolving some of the settled salts. The hot brine solution is removed through a valve at the bottom of the vessel reactor. There are several problems with this arrangement: (1) the temperature gradient from the top to the bottom of the vessel reactor is a source of heat loss and can significantly reduce the potential for recovering useful energy; (2) the hot brine is very corrosive and depressurization of such a brine through a valve is problematic; (3) the flow pattern in the vessel reactor does not ensure complete oxidation of organic matter so that a second stage reactor is usually required to further oxidize the fluid effluent from the vessel reactor; and (4) the brine may likewise contain unoxidized or partially oxidized products and may require special disposal if it is deemed hazardous.

Following oxidation and removal of inorganic solids, an effluent mixture is thus formed which is passed through a feed/product heat exchanger for cooling of the effluent mixture and for transfer of heat to the feed mixture. The effluent mixture leaving the feed/product heat exchanger can pass through high and low pressure liquid/vapor separators. Liquid and gas streams leaving the separators can be depressurized at pressure letdown valves or through an expander turbine.

A problem common to the above prior art processes of oxidation in the presence of water is the presence of inorganic salts, which can constitute a substantial portion of solids generated during oxidation of wastes. Many of these salts exhibit inverse solubility, being less soluble at higher temperature. An example of such an inorganic salt is calcium sulfate, which is a common component of "hard water." A solution of water and about 0.1 weight percent calcium sulfate, for example, will form solid α-anhydrite at temperatures above 85° C., which collects as scale on heat transfer surfaces of boilers because the heat transfer surfaces are hotter than the proximate feed stream temperature. Another inorganic salt which exhibits reverse solubility is sodium chloride (NaCl). At a pressure of about 200 atmospheres, for example, the solubility of sodium chloride decreases sharply from about 50 weight percent, at a temperature below 400° C., to about 0.01 weight percent above 400° C. Examples of common inorganic salts in which solubility with water decreases from about 20–30 weight percent at 200° C., to very small solubilities at temperatures above 300° C. include sodium phosphate ($Na_3PO_4$), sodium carbonate ($Na_2CO_3$), sodium sulfate ($Na_2SO_4$) and potassium sulfate ($K_2SO_4$).

Reduction of pressure at high temperatures in the reactor effluent by the above prior art processes has often been impractical because inorganic salts can obstruct flow through most depressurizing means, such as letdown valves and turbines, and consequently must first be separated from the effluent stream. Further, the presence of inorganic salts at high temperatures can also form a brine which is very corrosive, which, in turn, can reduce the useful life of apparatus exposed to these conditions. Also, the hot brine removed from a reactor or solid/liquid separating apparatus can be classified as a hazardous material in the event hazardous by-products are contained therein.

In addition, heating of some organic materials, when dissolved in water, will form a char. See, for example, U.S. Pat. No. 4,113,446. Char is often formed by depletion of hydrogen relative to the presence of carbon in organic material, and can accumulate on heat transfer surfaces of heat exchangers used for oxidation of wastes.

Other materials which are present in some wastes and which can settle from a reaction stream include silica, alumina, and oxides and carbonates of transition metals, heavy metals and rare earth metals. Metal oxides can form and precipitate from solutions when present as dissolved salts in feed streams, including, for example, organic ligands, such as ethylene diamine tetracetic acid, or inorganic complexing agents such as ammonia. Insoluble carbonates can form by combination of metals with carbon dioxide in the reactors or in cool-down heat exchangers. These materials are usually insoluble in both liquid water and water above the supercritical point.

Inorganic salts, char and metal-containing solids can accumulate on the walls of apparatus, thus limiting the operating capacity and useful life of such apparatus. Removal of accumulated deposits and scale within reaction systems can necessitate dismantling and cleaning of apparatus in order to remove hard scale caused by a prolonged presence of insoluble salts. In some cases, inorganic acids have been used to dissolve and remove scale. Consequent downtime can be expensive, time consuming, and can cause associated problems typical of shutdown and startup of continuous chemical processing. Further, the materials which must be used to remove deposits and scale from apparatus are themselves often highly corrosive, thereby necessitating frequent repair and replacement of such apparatus.

Thus, a need exists for an improved method and apparatus for oxidation of organic materials in the presence of inorganic materials in an aqueous stream which overcomes or minimizes the aforementioned problems.

SUMMARY OF THE INVENTION

This invention relates to a method and apparatus for oxidizing organic material, in an elongate tubular reactor having a substantially constant internal diameter from an inlet to an outlet of the elongate tubular reactor.

The method includes forming a pressurized reaction mixture of organic material, inorganic material, water and a source of oxygen, the pressurized reaction mixture having a pressure which is supercritical for water. The pressurized reaction mixture is passed through the elongate tubular reactor at a velocity sufficient to prevent settling of a substantial portion of solid particles from the reaction mixture within the elongate tubular reactor. Sufficient heat is introduced to the pressurized reaction mixture in the elongate tubular reactor to cause a substantial portion of the organic material in the reaction mixture to oxidize, the temperature of the reaction mixture being elevated to at least the supercritical temperature for water. The reaction mixture at the outlet end of said elongate tubular reactor is cooled to a temperature sufficient to allow formation of gas and liquid phases in the reaction mixture, the liquid phase including solid particles. The reaction mixture is discharged from the elongate tubular reactor at the outlet to thereby form an effluent mixture including solid particles, a liquid and a gas.

The elongate tubular reactor includes an inlet, an outlet and a substantially constant internal diameter form the inlet to the outlet. Suitable means form a pressurized reaction mixture of organic material, inorganic material, water and a source of oxygen, the pressurized reaction mixture having a pressure which is at least supercritical for water. Means for passing the pressurized reaction mixture through the elongate tubular reactor at sufficient velocity to prevent settling of a substantial portion of solid particles from the reaction mixture within the elongate tubular reactor. Suitable means introduce sufficient heat to the pressurized reaction mixture in the elongate tubular reactor to cause a substantial portion of the organic material in the reaction mixture to oxidize, the temperature of the reaction mixture being elevated to at least supercritical temperature for water. Suitable means cool the reaction mixture at the outlet end of the elongate tubular reactor to a temperature sufficient to allow formation of liquid and gas phases.

The present invention has many advantages. For example, the high velocity of the reaction mixture significantly reduces settling of particulates in the tubular reactor. Solid inorganic salts, present with the organic material or formed during reaction in the tubular reactor, may precipitate as solid particles in the high temperature region of the tubular reactor and dissolve as the temperature of the reaction mixture is lowered, thus significantly reducing the need to separate solids from a hot effluent stream and diminishing the possibility of clogging the apparatus- The frequency with which the apparatus must be cleaned and associated costs of processing down-time are also significantly reduced. Further, cleaning methods can be employed which do not appreciably damage the reactor.

BRIEF DESCRIPTION OF THE DRAWINGS

FIG. 3 is a series of schematic representations illustrating different configurations for heating and cooling of tubular reactors according to the present invention.

DETAILED DESCRIPTION OF THE INVENTION

The above features and other details of the method and apparatus of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention.

Figure 1:
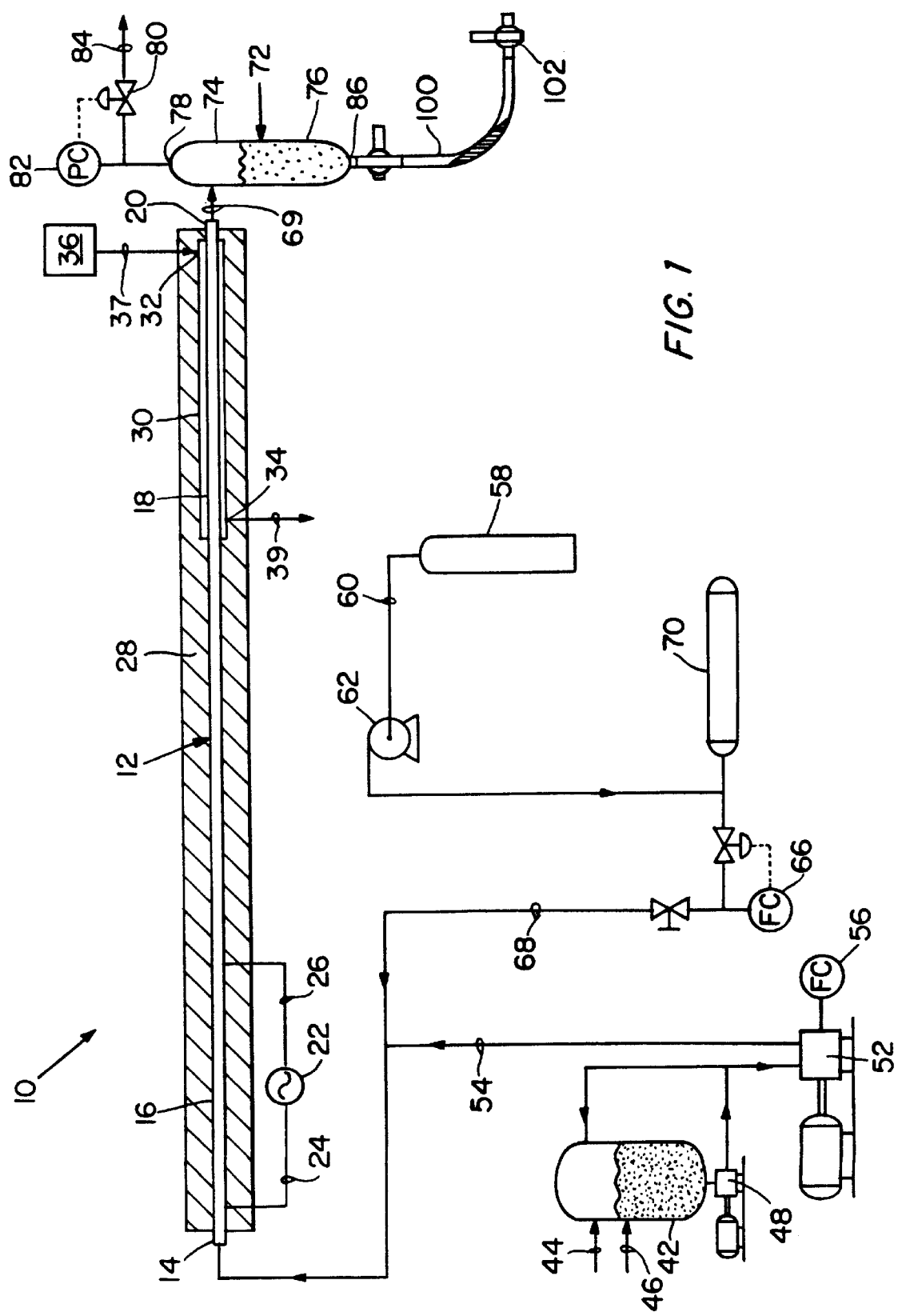
FIG. 1 is a schematic representation of one embodiment of a reaction system of the invention.

Reaction system 10, shown in FIG. 1, includes a tubular reactor 12. Tubular reactor 12 has inlet 14, inlet end 16, outlet end 18 and outlet 20. The internal diameter of tubular reactor 12 is substantially constant throughout its length. Tubular reactor 12 is an elongate tubular reactor. The interior wall of tubular reactor 12 is preferably a continuous smooth surface from inlet 14 to outlet 20.

A feed mixture is formed by mixing, and then pressurizing, organic materials, inorganic materials, and water to an absolute pressure of greater than about 218 atmospheres. Oxygen is then introduced to the feed mixture to form a reaction mixture. The reaction mixture is directed into tubular reactor 12. The reaction mixture is heated within tubular reactor 12 to cause a substantial portion of the organic material in the reaction mixture to oxidize, whereby lower molecular weight products are formed from the organic material. Solid inorganic salts, carried from the feed mixture and also formed during oxidation of organic material, are dissolved in the reaction mixture by cooling the reaction mixture at outlet end 18. An effluent mixture is discharged from tubular reactor 12 and separated into gas, liquid and solid phase components, which components are collected and depressurized.

The reaction mixture is heated by conducting an electrical current through tubular reactor 12 at inlet end 14. The electrical current is generated by electrical power source 22, which is connected to tubular reactor 12 by wires 24,26. Resistance to conduction of electrical current by tubular reactor 12 generates sufficient heat to heat the reaction mixture at inlet end 14, thereby contributing to elevation of the temperature of the reaction mixture to a supercritical temperature for water. Preferably, the temperature of the reaction mixture is elevated to above about 250° C. It is to be understood that heat generated by exothermic reaction of the reaction mixture with water and oxygen in tubular reactor 12 also contributes to elevation of the temperature in the reaction mixture to a temperature which is supercritical for water.

Tubular reactor 12 can be insulated by thermal insulator 28 to diminish heat loss from within tubular reactor 12 during oxidation. Following oxidation of the organic material, the reaction mixture is cooled at outlet end 16 of tubular reactor 12 by a suitable heat-transfer fluid. Examples of suitable heat-transfer fluids include water, etc. Cooling jacket 30 includes cooling inlet 32 and cooling outlet 34. A heat-transfer fluid is conducted from heat-transfer fluid source 36 through line 37 and cooling inlet 32 into cooling jacket 30, and is then discharged from cooling jacket 30 through cooling outlet 34 through line 39.

Means for forming a pressurized reaction mixture include formation of a pressurized feed mixture and introduction to the pressurized feed mixture of a pressurized source of oxygen. The feed mixture is formed by mixing at least one organic material, at least one inorganic material and water. Organic and inorganic materials are included in, for example, activated raw sludge from a municipal sewage treatment plant, sludge from manufacturing facilities for pulp, paper, pharmaceuticals, foods, beverages and chemicals, or military wastes, such as chemical warfare agents, explosives, rocket propellant or radioactive materials.

Organic material, inorganic material and water are introduced to feed tank 42 through waste line 44. The feed mixture can be neutralized to a pH of between about six and about ten by suitable means, not shown. Water can be introduced through water line 46 into feed tank 42 for mixture with material from waste line 44 to obtain a feed mixture having a desired heating value. Examples of suitable heating values are in the range of between about 300 and about 2000 Btu/lb. calories per gram. Alternatively, aqueous material which is sufficiently dilute can be received into feed tank 42 without addition of water. Feed mixture in feed tank 42 can be recirculated through recirculating pump 48 and recirculation line 50. At least a portion of the feed mixture is diverted from recirculation line 50 and is then pressurized by feed pump 52 to an absolute pressure of greater than about 218 atmospheres. Pressurized feed mixture is directed through feed line 54 to tubular reactor 12 at inlet end 14 by feed pump 52. The rate of flow of reaction mixture through tubular reactor 12 can be controlled by feed controller 56, which regulates operation of feed pump 52.

Oxygen is introduced to the feed mixture by directing flow of oxygen from oxygen source 58, through oxygen line 60 to booster compressor 62. The source of oxygen can be, for example, compressed air. Oxygen is then pressurized by booster compressor 62 and is directed by booster compressor 62 through oxygen feed line 64, oxygen controller 66 and oxygen feed line 68, and then introduced to the feed mixture at feed line 54. Oxygen accumulator 70, at oxygen feed line 64, can facilitate control of oxygen feed to the feed to tubular reactor 12. Preferably, the pressure in oxygen accumulator 70 is about one-hundred psi greater than the pressure of reaction mixture at inlet 14 of tubular reactor 12.

Oxygen mixes with the feed mixture to thereby form, with the pressurized feed mixture, the reaction mixture. It is to be understood, however, that oxygen can be fed to the feed mixture through a port, not shown, which can be located at any point along inlet end 16 of tubular reactor 12, to thereby form the reaction mixture. The feed mixture can be unheated or partially heated at the point of introduction of oxygen to form the reaction mixture. However, the preferred location of oxygen feed line 68 is at feed line 54, as shown in FIG. 1, whereby oxygen is mixed with the feed mixture before introduction of the feed mixture to tubular reactor 12.

The pressurized reaction mixture is passed through the tubular reactor 12 by a pressure drop maintained between inlet 14 and outlet 20 of tubular reactor 12. The pressure at inlet 14 is established by the rate of flow of feed materials, as maintained by feed pump 52 and oxygen booster compressor 62. The pressure at outlet 20 is controlled by the rate at which gas, which is generated in tubular reactor 12, is depressurized after discharge from tubular reactor 12.

Means for introducing sufficient heat to the pressurized reaction mixture at inlet end 16 of tubular reactor 12 to cause a substantial portion of the organic material in the reaction mixture to oxidize include, for example, direct ohmic heating of tubular reactor 12 by an electrical current generated by electrical power source 22. Alternatively, other suitable means for heating can be employed, such as a heating jacket and heat transfer fluid, not shown. The reaction mixture is heated within inlet end 16 to elevate the temperature of the reaction mixture and thereby increase the rate of oxidation of the reaction mixture. The organic material is thereby substantially oxidized within tubular reactor 12.

Following oxidation, the reaction mixture within outlet end 18 can include oxygen ($O_2$), carbon dioxide ($CO_2$), nitrogen ($N_2$) and water as a homogeneous fluid phase.

Solids, such as metal oxides, metal carbonates, and inorganic salts which are substantially insoluble in water at high temperatures, i.e. above about 300° C., can also be included in the reaction mixture after the organic material has been oxidized.

The reaction mixture is then cooled to form an effluent mixture. Means for cooling the reaction mixture at outlet end 16 include a heat-transfer fluid and a cooling jacket 30, through which the heat-transfer fluid is conducted. The heat-transfer fluid is introduced to cooling jacket 30 through cooling inlet 32 and is discharged from cooling jacket 30 through cooling outlet 34. The reaction mixture thereby cools, thus allowing the reaction mixture to form an effluent mixture which includes gas and liquid fluid phases.

As the reaction mixture cools, a substantial portion of solid inorganic salts in the reaction mixture at outlet end 18 can dissolve in the liquid phase of the reaction mixture. Such inorganic salts can include, for example, calcium sulfate, sodium chloride, sodium phosphate, sodium carbonate, sodium sulfate and potassium sulfate.

At outlet 20 of tubular reactor 12, the effluent mixture is a combination of three phases. A first phase is gaseous and typically includes, as major constituents: carbon dioxide ($CO_2$); unreacted oxygen ($O_2$); and, if air is used as the oxidant, nitrogen ($N_2$). Minor constituents of the gaseous phase can include, for example: carbon monoxide (CO) and nitrous oxide ($N_2O$). A second phase is liquid and generally includes water with carbon dioxide and inorganic salts dissolved therein. A third phase includes solid particulates that can include, for example, oxides, carbonates, and other inorganic materials which are water-insoluble.

Upon discharge from outlet 20, the effluent mixture is directed through line 69 to gas/liquid phase separator 72. Gas/liquid phase separator 72 has upper portion 74 and lower portion 76. The gaseous phase and liquid phase of the effluent mixture separate in gas/liquid phase separator 72. The gaseous phase of the effluent mixture is then depressurized to below the critical pressure of water by passage of the gaseous phase through gas outlet 78, which is disposed at upper portion 74 of gas/liquid separator 72, and then through flow control valve 80. Flow control valve 80 is controlled by pressure controller 82. The depressurized gaseous phase then leaves reaction system 10 through vent line 84.

The liquid phase and solid particulates of the effluent mixture exit reaction system 10 through bottom outlet 86, which is disposed at lower portion 76 of gas/liquid phase separator 72, and are directed to suitable means for depressurization, such as a back-pressure regulator, or flow control valve, not shown. The liquid phase discharged from gas/liquid phase separator 72 is suitable for further processing, including removal of dissolved inorganic salts by conventional methods, such as by evaporation or reverse osmosis.

Figure 10:
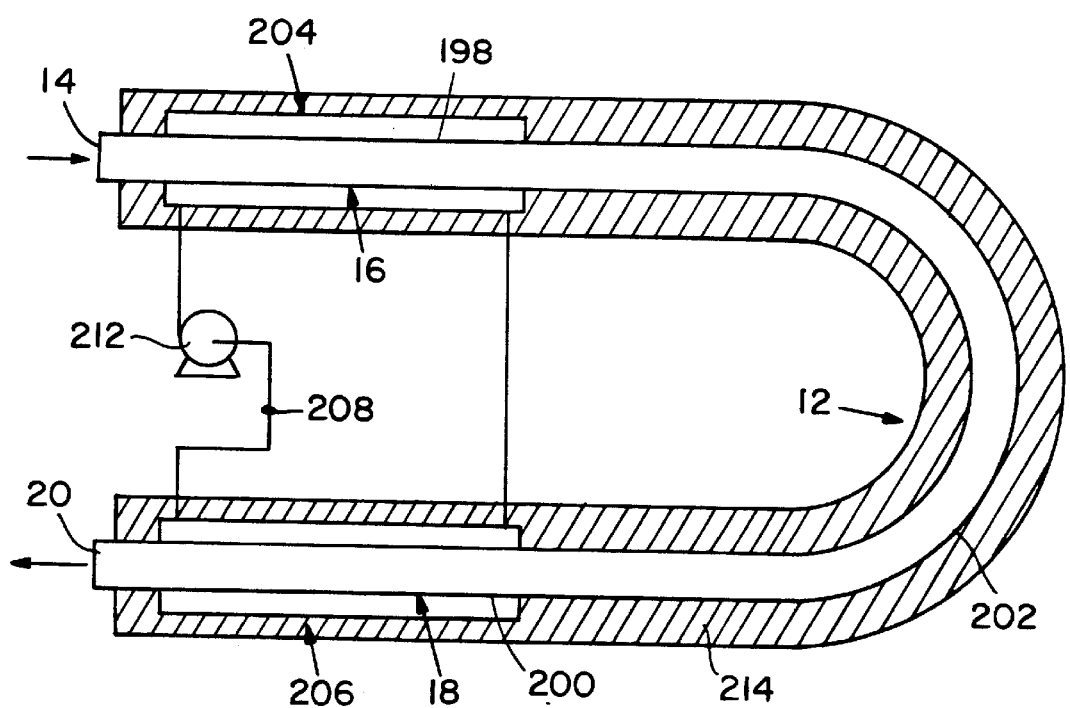
FIG. 10 is a schematic representation of an alternate embodiment of a tubular reactor of the invention.

Solids remaining within gas/liquid phase separator 82 can settle and collect at bottom outlet 86. Such solids can include transition metals, heavy metals, rare earth metal oxides and metal carbonates, and insoluble inorganic salts. Solids collected within separator 82 are periodically removed from reaction system 10 through solids take-off line 100 and valve 102. Preferably, the solid particulates are separated from the liquid prior to depressurization by a suitable system, such as is illustrated in FIG. 10 and described below.

Reaction system 10 is constructed of suitable materials for exposure to the reaction mixture and to the effluent mixture. Examples of suitable materials for reaction system 10, except for tubular reactor 12, include stainless steel, etc. Examples of suitable materials of construction of tubular reactor 12 include Inconel 625, Hastelloy C-276, etc.

The maximum temperature reached within tubular reactor 12 can be determined from an energy balance along tubular reactor 12, beginning from inlet 14. The change in temperature of the reaction mixture as it passes through any portion of tubular reactor 12 is a function of the net rate of heat generation at that portion of tubular reactor 12. The net rate of heat generation at any portion of tubular reactor is defined as follows:

Net rate of heat generation = rate of heat introduction − rate of heat loss + rate of heat liberation by reaction

At least a portion of inlet end 16 is heated. Throughout the heated portion of inlet end 16, the rate of heat introduction to the reaction mixture is greater than the rate of heat loss. Thus, the net rate of heat generation is positive and the temperature of the reaction mixture will increase. When the temperature of the reaction mixture is below 100° C., the rate of heat liberation by reaction is usually negligible and the net rate of heat generation is about equal to the rate of heat introduction. Above 250° C., the rate of heat liberation by reaction typically contributes significantly to the rate of temperature rise.

Once heating is terminated, there will be a finite heat loss from the reaction mixture to the surroundings. If the rate of heat liberation by reaction exceeds the rate of heat loss, then the temperature of the reaction mixture will continue to rise. On the other hand, if the reaction rate is not high enough to provide a sufficiently rapid heat liberation to compensate for heat loss, then the temperature of the reaction mixture decreases after heat introduction to the reaction mixture is terminated. For reaction mixtures containing 15 wt-% or more organic material, a temperature of at least 250° C. is generally preferred at the end of the heated portion of tubular reactor 12, so that the rate of reaction is sufficient to cause the reaction mixture temperature to increase further after leaving the heated portion.

Figure 2A:
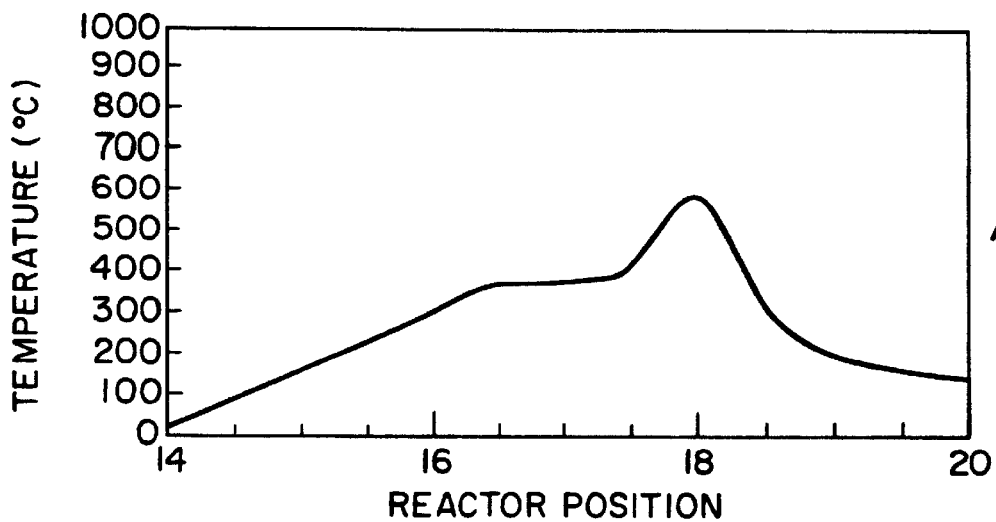
FIG. 2 is a series of plots illustrating examples of temperature profiles along a tubular reactor for reaction mixtures having different heating values.
Figure 2B:
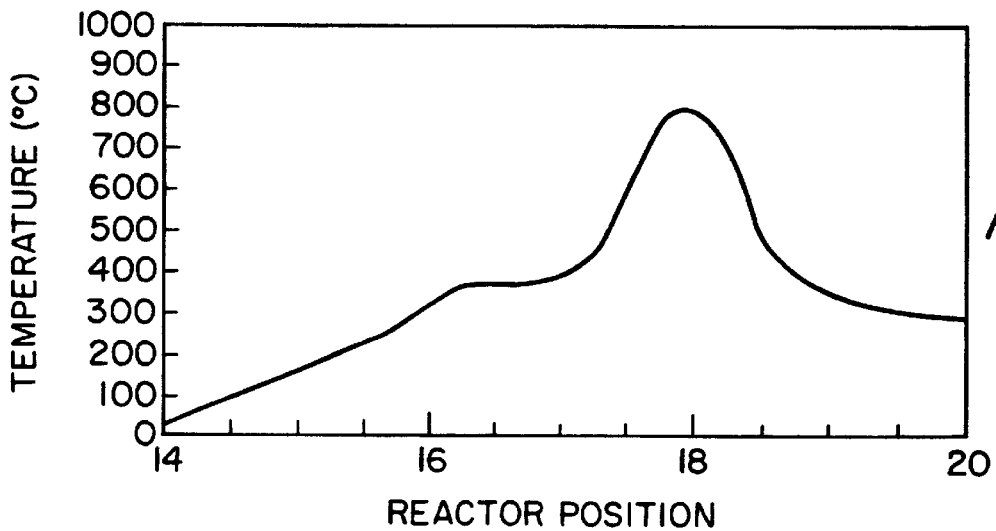

The maximum temperature reached in tubular reactor 12 will depend, in part, upon the configuration of tubular reactor 12 at heating and cooling portions of tubular reactor 12, the amount of heat introduced in inlet end 16 and the heating value of the reaction mixture. For the configuration of tubular reactor 12, as shown in FIG. 1, a portion of tubular reactor 12 between wires 24,26 and jacket 30 is unheated and insulated. For that configuration, FIG. 2 is a series of plots illustrating the temperature profiles for reaction mixtures having various heating values as those reaction mixtures pass through tubular reactor 12, shown in FIG. 1. For example, as shown in FIG. 2A, curve 88 represents a temperature profile for a reaction mixture having an intermediate heating value of about 800 Btu/lb. Curve 90, shown in FIG. 2B, represents a temperature profile for a reaction mixture, having a heating value of about 1500 Btu/lb, and exposed to the same operating conditions of system 10 as the reaction mixture having the temperature profile shown in FIG. 2A. Curve 92, shown in FIG. 2C, represents the temperature profile for a reaction mixture, having a heating value of about 200 Btu/lb, and which is exposed to the same operating conditions of system as the reaction mixtures having the temperature profiles shown in FIGS. 2A and 2B.

As shown in FIG. 2A, the reaction mixture is heated to 300° C. at the heated portion of inlet end 16. A maximum temperature of about 600° C. is reached, at which point between about 95% and about 99% of the organic material has been oxidized. Further oxidation of the organic material in the reaction mixture can take place at outlet end 18. However, the temperature of the reaction mixture falls when the rate of heat loss from the reaction mixture exceeds the rate of heat generation by reaction.

As can be seen in FIG. 2B, a reaction mixture having a heating value of about 1500 Btu/lb, reaches a higher peak temperature: about 800° C. The peak temperature in FIG. 2B is also reached more quickly than that in FIG. 2A, because the concentration of organic material in the reaction mixture represented by curve 90 is higher than that of the reaction mixture represented by curve 88. The higher concentration of organic material in the reaction mixture represented by curve 90 causes the reaction rate of that reaction mixture to accelerate faster than the reactor mixture represented by curve 88.

Figure 2C:
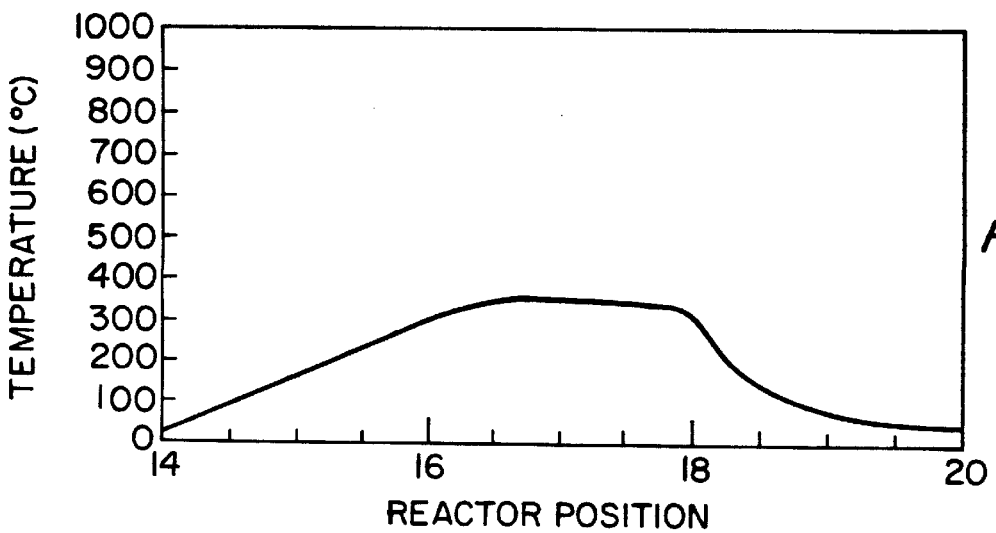

Curve 92, shown in FIG. 2C, represents a temperature profile of a reaction mixture which does not have sufficient heating value to reach temperatures above about 374° C., even when heated in the heated portion of inlet end 16 to a temperature of about 300° C. In such cases, the degree of oxidation generally does not exceed 80%, as has been found in the Zimmerman wet air oxidation process. See, for example, Wilhelmi, et al., loc. cit.

As shown in FIG. 2, the heating value of the reaction mixture and the amount of heat introduced at inlet end 16 determine the maximum temperature of the reaction mixture that can be reached in tubular reactor 12. The maximum temperature that can be safely used is determined by the tensile strength of the reactor material. For example, where the material of construction of tubular reactor 12 includes Hastelloy C-276, which has excellent corrosion-resistance, the preferred maximum temperature is less than about 550° C. In another example, where the material of construction of tubular reactor 12 includes Inconel 625, which has good corrosion resistance, the preferred maximum operating temperature is less than about 650° C.

The reaction mixture having a heating value of about 1500 Btu/lb would exceed the maximum recommended temperature for Inconel 625, as shown in FIG. 2B. For reaction mixtures having such high heating values, alternate reactor configurations are generally desirable. FIG. 3 schematically represents two such alternate tubular reactor configurations. For example, in FIG. 3A, jacket 94 is disposed at tubular reactor 12 at a point along the path of flow of the reaction mixture which preceeds cooling jacket 30. Jacket 94 has an inlet 96 and an outlet 98. A suitable coolant, such as water at above the critical pressure is directed from water source 100 through inlet 96 and along tubular reactor 12 in a direction countercurrent to the direction of flow of the reaction mixture. The water can be converted to steam in heat exchanger 94. The water, either as a liquid or steam, is then discharged from heat exchanger 94 through outlet 98. Heat exchanger 94 allows a higher rate of heat loss from the reaction mixture, thereby keeping the maximum temperature of the reaction mixture below about 600° C.

For relatively dilute reaction mixtures, which have low heating value, such as below about 300 Btu/lb, additional organic material can be added to the reaction mixture to thereby increase the heating value of the reaction. Alternatively, other reactor configurations may be desirable to avoid the addition of fuel. For example, the reactor configuration shown in FIG. 3B can be employed to process a mixture with heating value of 300 Btu/lb or less. In this embodiment, electrical power source 104 is connected to tubular reactor 12 along the path of flow between wires 24,26 and cooling jacket 30 by wires 106,108. An electrical current is conducted through tubular reactor 12 by electrical power source 104 to thereby heat the reaction mixture to a temperature sufficient to oxidize a substantial portion of the organic material in the reaction mixture.

Figure 4A:
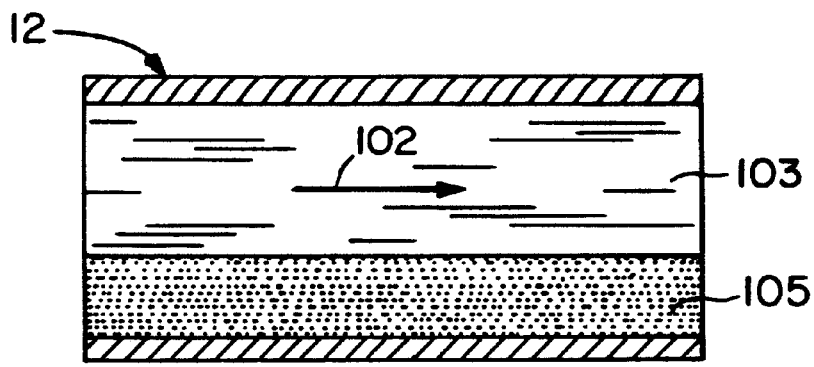
FIG. 4 is a series of drawings illustrating patterns of flow of solid particles and fluid in a tubular reactor.
Figure 4B:
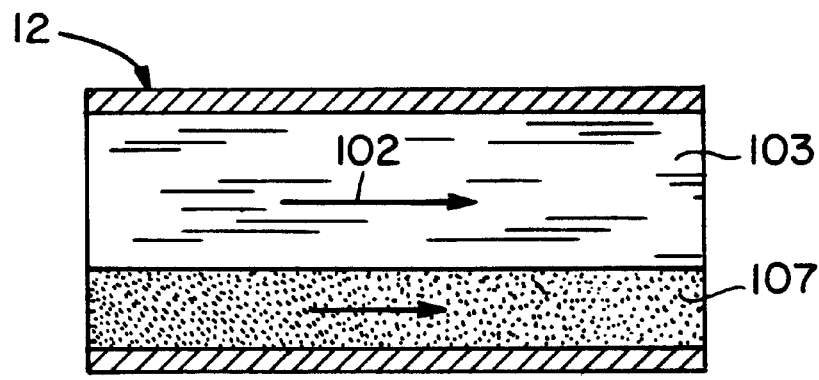
Figure 4C:
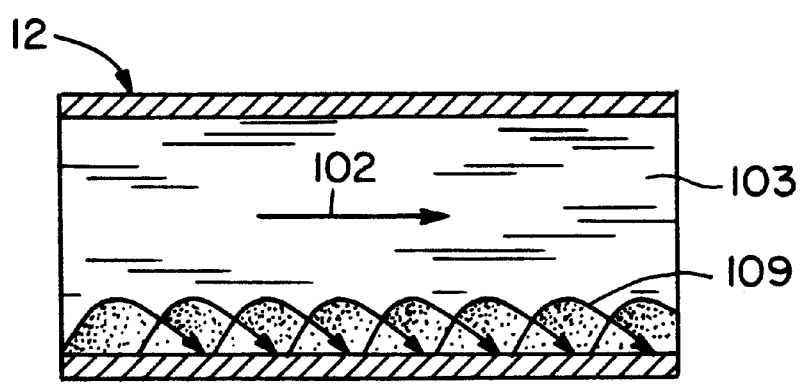
Figure 4D:
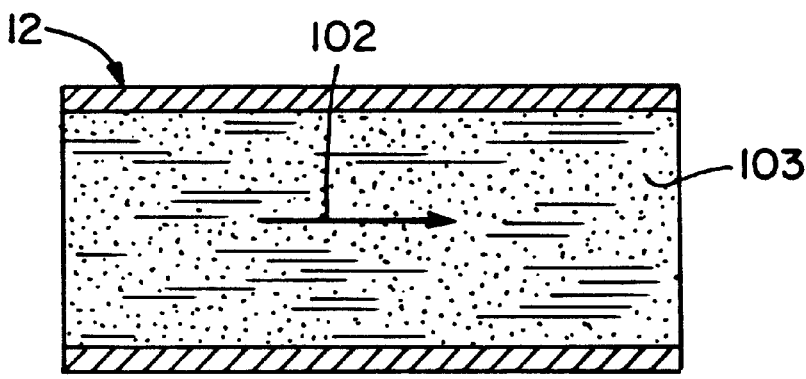

The velocity of flow of the reaction mixture through tubular reactor 12 is maintained at a rate which is sufficient to prevent settling of a substantial portion of solid particles within tubular reactor 12. FIG. 4 illustrates the pattern of solid particle flow through tubular reactor 12 under four different velocity regimes. The direction of fluid flow is indicated by arrow 102. For example, as can be seen in FIG. 4A, at relatively low fluid velocities, particles will settle out of reaction mixture 103 and a static bed 105 will form in tubular reactor 12. At higher velocities, a bed of solids can become a sliding bed 107 or saltating bed 109, as can be seen in FIGS. 4B and 4C, wherein the velocity of the solid particles is significantly less than that of the remainder of the reaction mixture. As velocity of the reaction mixture through tubular reactor 12 further increases, the solid particles will be suspended in the reaction mixture fluid and travel down the pipe at about the velocity of the reaction mixture, as can be seen in FIG. 4D.

Figure 5:
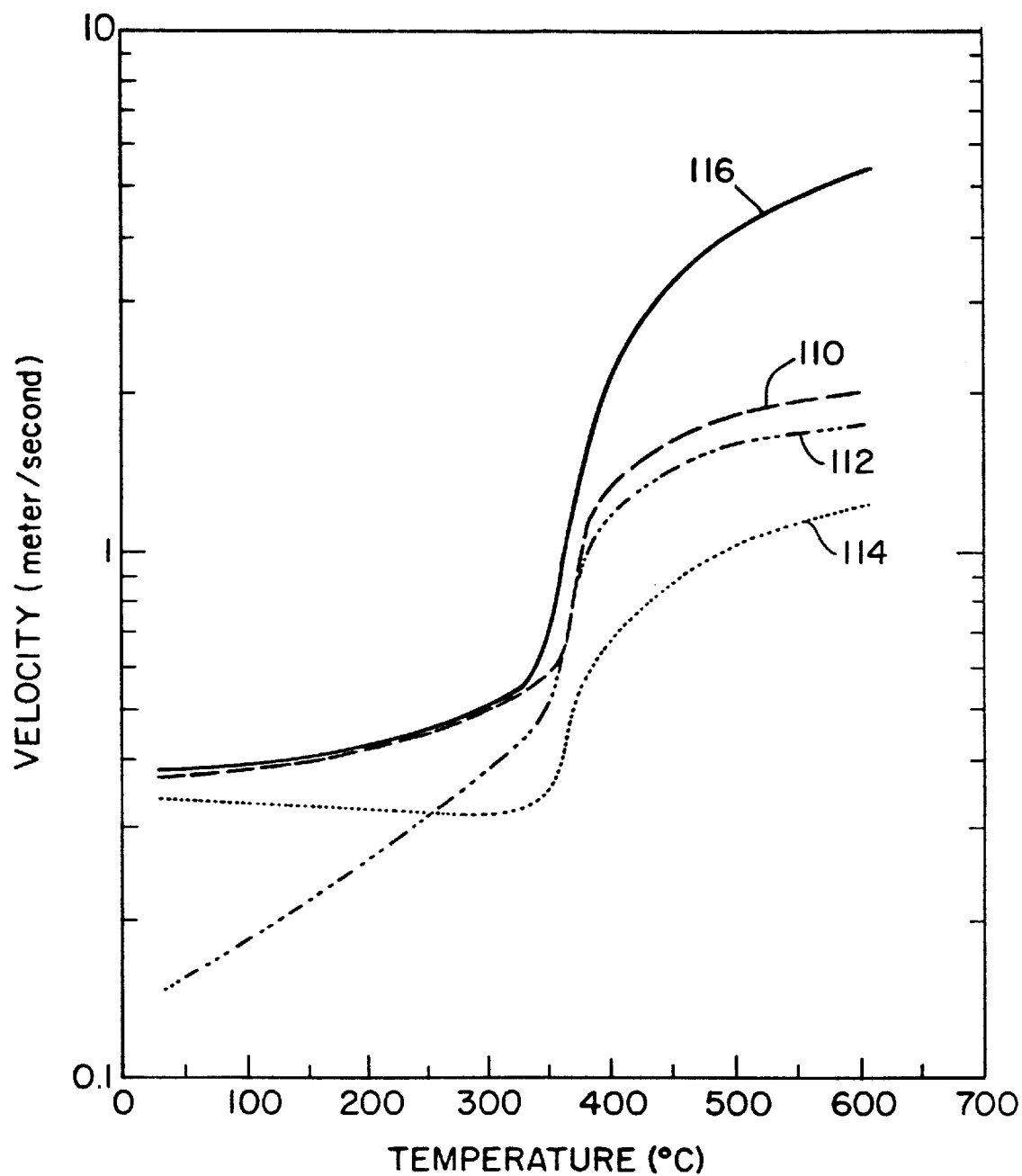
FIG. 5 is a series of plots illustrating variation of critical velocities with temperature for solid particle transport in a tubular reactor.

The velocity corresponding to the onset of each type of flow is called the "critical velocity" for that type of flow. The critical velocities are complex functions of particle size, particle density, particle concentration, pipe diameter, and fluid phase hydrodynamic properties (such as density and viscosity). Correlations have been published for the critical velocities of each type of flow pattern illustrated in FIG. 4. See, for example: Thomas, A.D. "Predicting the Deposit Velocity for Horizontal Tubulent Pipe Flow of Slurries," *Int. J. Multiphase Flow,* Vol. 5, 1979, pp. 113–129; Bragg, G. M. and Kwan, M. Y. M. "Prediction of Transport Velocities of Dust in Horizontal Ducts." *Pneumotransport,* Fourth International Conference on the Pneumatic Transport of Solids in Pipes, Jun. 26–28, 1978, pp. C2–16 through C2–26; Davies, J. T. "Calculation of Critical Velocities to Maintain Solids in Suspension in Horizontal Pipes." *Chemical Engineering Science,* Vol. 42, No. 7, 1987, pp. 1667–1670. As an example, equations available in these references were used to calculate each of the critical velocities for a pipe having an inner diameter of 0.264 inches, particles having a diameter of 20 microns, and density of 2.7 gm/cm$^3$ and a concentration of about 1 wt-% in a liquid fluid. Fluid properties were estimated for a mixture of 9 wt-% organic, 1 wt-% inorganic, 90 wt-% water plus oxygen in 20% excess of stoichiometric. The fluid properties were estimated at 250 atmosphere and as functions of temperature from 25 to 600° C. The calculated critical velocities are shown in FIG. 5 as a function of temperature. Note that curve 110, which is a plot of the critical velocities for suspension flow, is higher than curves 112 and 114, which are plots of the critical velocities for sliding or saltating flow, respectively.

Curve 116, also shown in FIG. 5, is a plot of the velocity for a reaction mixture which is similar to the fluid represented by curves 110,112 and 114. The reaction mixture has a feed flowrate of about 830 g/min. The velocity of the reaction mixture varies down the tubular reactor as the inverse of fluid density. The velocity profile of curve 116 corresponds to the minimum mass flowrate for which the actual velocity will equal or exceed the critical velocities for suspension flow of solid particles anywhere in the tubular reactor where the solid particles have a diameter of about 20 microns and a density of about 2.7 g/cm$^3$. Note that the actual velocity for curve 211 varies from about 0.37 to about 5.5 meter/second (or about 1 to 17 feet/second).

Figure 6:
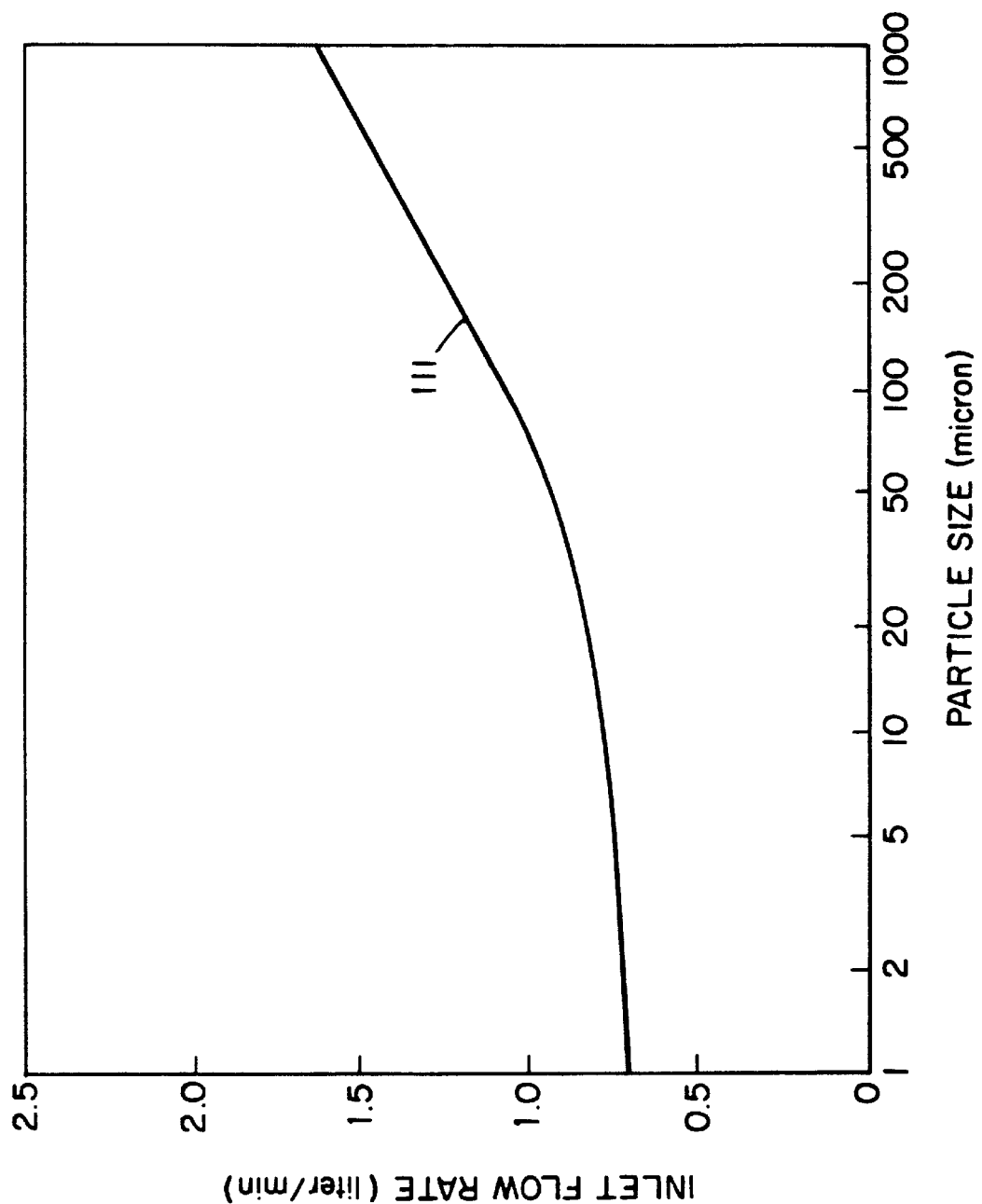
FIG. 6 is a plot illustrating variation of a minimum mass flowrate for suspension flow with respect to particle size in a liquid.

Curve 111, shown in FIG. 6, illustrates the variation of the minimum mass flowrate for a 0.264 inch i.d. tube as a function of particle diameter, for a particle density of 2.7 g/cm$^3$. Plots of the type shown in FIG. 6 are used as a guide to determine pipe diameter for a given reaction mixture mass flowrate and given maximum particle size in the feed. To account for inaccuracies in the critical velocity correlations and in estimates of reaction mixture properties, a design velocity of at least 20% higher than the minimum is preferred. If particle growth within tubular reactor 12 is anticipated, a higher contingency factor should be used. As an example, a solid rocket propellant contains 20 micron aluminum particles, having a density of about 2.7 g/cm$^3$. To process a propellant slurry of 1 wt-% aluminum, a pipe having an internal diameter of about 0.264 inches can be employed for a feed mass flowrate of about 1 liter/min.

Having so chosen the pipe diameter to satisfy the criterion for critical suspension flow, the reactor length is chosen to provide: (1) adequate surface area for heating and cooling the reaction mixture at inlet end 16 and outlet end 18, respectively, and (2) sufficient residence time to reach the desired degree of oxidation. Residence times in the range of between about five and about ten minutes are typically sufficient to reach oxidation of organic carbon in the range of between about 99% and about 99.9999% when the peak temperature is in the range of between about 550 and about 650° C. "Residence time," as that term is used herein, is defined as the volume of tubular reactor 12, divided by the volumetric flow rate of the reaction mixture at inlet 14 of tubular reactor 12. For the previous example of solid rocket propellant, a residence time of seven minutes would require a reactor having a volume of about seven liters if the entrance flowrate were about one liter/min. For a 0.264 inch diameter reactor, a length of about 200 meters, or 650 feet, would, therefore, be required.

When heating an aqueous solution containing certain inorganic salts, scale can build up on the wall of the heated surface. In addition, some organics can form a char when heated in water, which char can deposit along, and on, tubular reactor 12.

Figure 7:
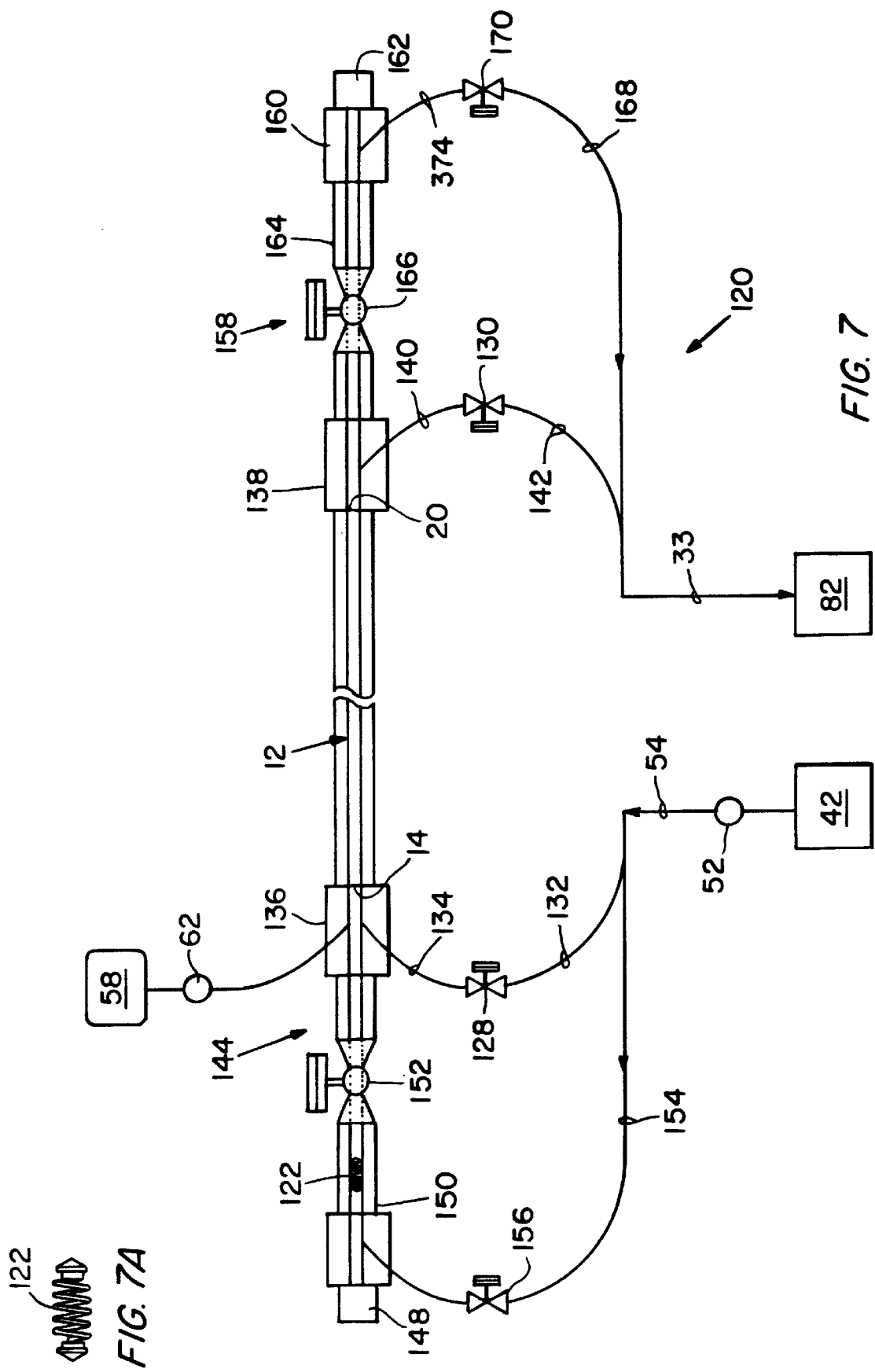
FIG. 7 is a schematic representation of a cleaning system, including a wire brush, for cleaning a tubular reactor of the reaction systems illustrated in FIG. 1.

Solids removal system 120, for removing solids collected in tubular reactor 12, is shown in FIG. 7. Solids removal system 120 includes brush 122, an enlarged view of which is shown in FIG. 7A, whereby solids which collect along tubular reactor 12 are removed periodically by directing brush 122 through the length of tubular reactor 12. An example of a suitable brush is a wire brush which is suitable for heat exchanger service, such as wire brushes commercially available from W.S.A., Inc. Solids which can be removed from tubular reactor 12 by brush 122 can include, for example, scale, char, metal oxides, metal carbonates and other insoluble metal salts, and undissolved inorganic salts. In a particularly preferred embodiment, brushing is done with sufficient frequency to substantially prevent solid deposits in tubular reactor 12 from sufficiently hardening to form scale. Depending on the type of solids to be removed, the preferred periodicity of brushing is in the range of between about fifteen minutes and about twenty hours.

When relatively frequent brushing is preferred, it is often desirable to perform the brushing operation with a minimum of down-time, which is incurred when flow of the reaction mixture through tubular reactor 12 is suspended. For this purpose, an "on-line cleaning method" has been devised to provide for cleaning of tubular reactor 12 without incurring significant down-time of reaction system 10. In the "on-line cleaning method," brush 122 of solids removal system 120 is directed through tubular reactor 12 while continuing oxidation of the reaction mixture within reaction system 10.

Solids removal system 122, shown in FIG. 7, is an example of a suitable system for on-line cleaning of tubular reactor 12. A pressurized feed material is directed by feed pump 52 from feed tank 42 through line 54, line 132, valve 128, line 134 and into fitting 136 at inlet 14 of tubular reactor 12. Pressurized oxygen is directed from oxygen source 58 through line 60 by oxygen booster compressor 62 into fitting 136, wherein the reaction mixture is formed. The effluent from tubular reactor 12 passes through fitting 138 at outlet 20, and then through line 140, valve 130, line 142 and line 33 into phase separator 72.

Projection 144 extends from fitting 136. Projection 144 includes fitting 146, having end cap 148. Line 150 is disposed between fitting 146 and fitting 136, and valve 152 is disposed at line 150. Line 154 extends between line 54 and fitting 146. Valve 156 is disposed at line 154.

Projection 158 extends from fitting 138. Projection 158 includes fitting 160, having end cap 162. Line 164 is disposed between fitting 138 and fitting 160. Valve 166 is disposed at line 164. Line 168 extends between fitting 160 and line 33. Valve 170 is disposed at line 168.

While valve 152 and valve 156 are closed, end cap 148 is removed and brush 122 is inserted into line 150 through fitting 146. End cap 148 is then reinserted onto fitting 146. Brushing is commenced by opening valve 156, valve 152, valve 166 and valve 170, and then closing valve 128 and valve 130. Flow of feed material is thereby diverted through line 154, projection 144, and through projection 158 and line 168.

During this diversion, brush 122 is carried along with the feed material into tubular reactor 12, wherein the reaction mixture provides the motive force for carrying brush 122 through and out of tubular reactor 12. The flow of reaction mixture around and through brush 122 exerts a force on brush 122 sufficient to carry it into and through tubular reactor 12. Brush 122 is designed to provide very little friction when there are not deposits on the wall of tubular reactor 12 and increasing friction with increase amounts of deposits. This friction exerts a drag force on brush 122, which results in the brush velocity being lower than the reaction mixture velocity wherever there are deposits on the reactor wall.

By frequent brushing, the velocity of brush 122 to the velocity of the reaction mixture through tubular reactor 12 can be essentially equivalent. Brush 122 can thereby pass through tubular reactor 12 at about the same velocity as the reaction mixture. Solids carried along by brush 122 will thereby experience no less time at a given temperature than solids carried through tubular reactor 12 by suspension flow. Thus, solids carried along by brush 340 should experience sufficient oxidation without hardening as scale within tubular reactor 12.

Brush 122 then passes through fitting 138, line 164 and comes to rest in fitting 160, where it comes to rest. Effluent continues along this same path, but continues out of fitting 160 through line 168 to gas/liquid phase separator 72.

Once brushing has been completed, the reaction flow path is rediverted by opening valve 128 and valve 130 and by closing valves 156,152,166 and 170. Brush 340 is then removed from fitting 160 by removing end cap 162. End cap 162 is then reinserted onto fitting 160. Preferably, all fittings, lines and valves of solids removal system 120 from fitting 356 to fitting 368 have about the same internal diameter as does tubular reactor 12, so that the brush 122 will enter and exit tubular reactor 12 without significant interference.

Insertion and removal of brush 122 can be automated by replacing end caps 148 and 162 with suitable valves and mechanical devices, such as magazines employed to load bullets into gun barrels.

If brushing cannot be done using the above described on-line cleaning method, then periodic cleaning can be performed by an "off-line cleaning method," wherein the flow of feed material and oxygen through tubular reactor 12 is temporarily suspended. A suitable brush is then passed through tubular reactor 12.

Off-line cleaning of tubular reactor is preferred where, for example, solids removed by brushing are significantly less oxidized than the remainder of the effluent discharged from tubular reactor 12. Examples of conditions where oxidation of such solids is relatively incomplete include, for example, when the temperature of tubular reactor 12 decreases during cleaning, when oxygen flow is suspended and when brush 122 pushes solids through tubular reactor 12 at a velocity which is significantly higher than the velocity of the reaction mixture between cleanings. Under these conditions, it is generally not advisable to mix solids removed by brushing, such as solids that may be hazardous if not oxidized sufficiently, with the effluent mixture discharged between cleanings.

Figure 8:
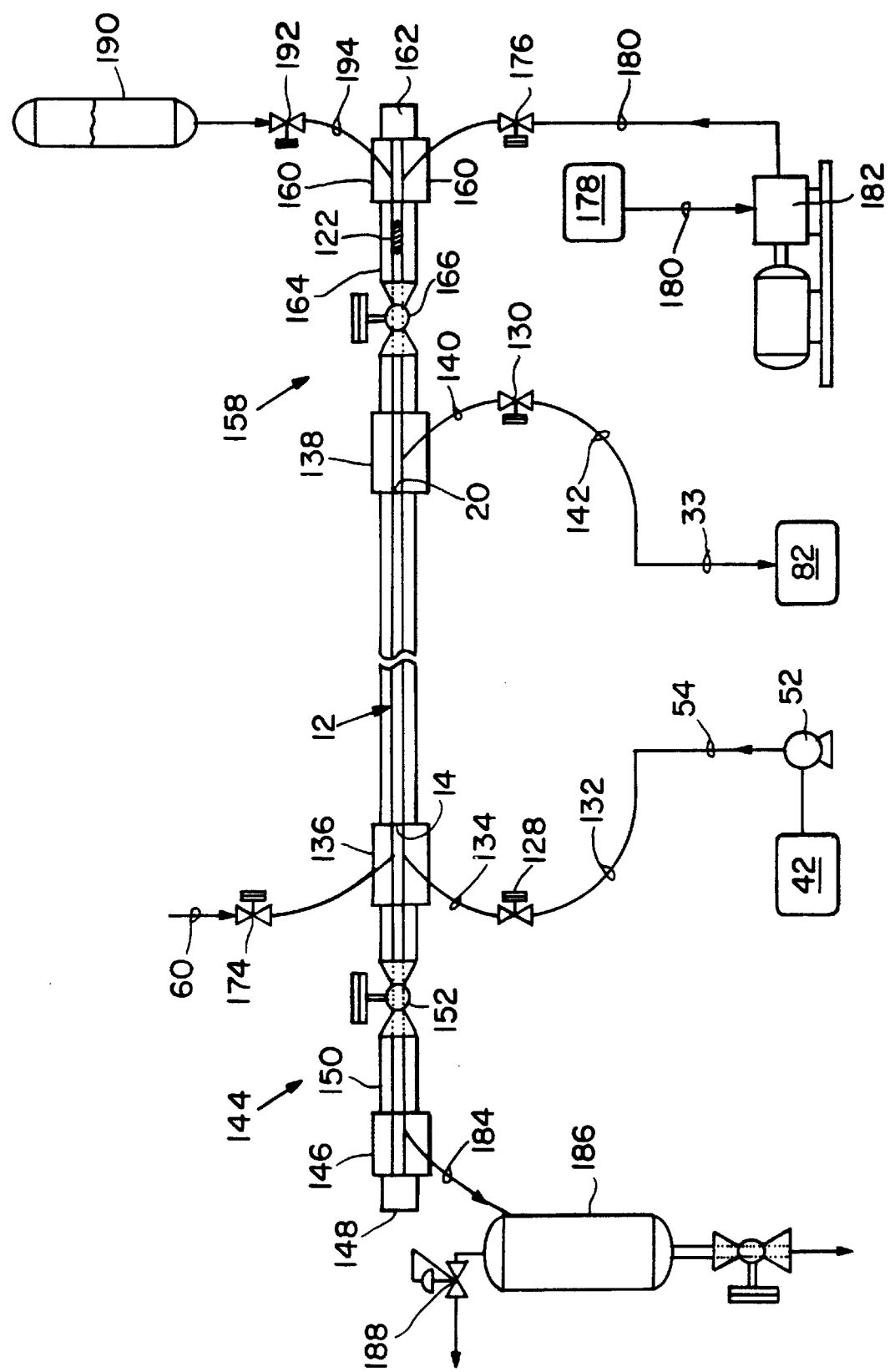
FIG. 8 is a schematic representation of an embodiment of a cleaning system for cleaning tubular reactors of the reaction system illustrated in FIG. 1.

In one embodiment of off-line cleaning, brush 122 can be directed through tubular reactor 12 in direction opposite to that of the flow of the reaction mixture. For example, solids removal system 172, shown in FIG. 8, can be employed for off-line cleaning with brush 122.

Between cleanings, valves 152,166 are closed and valve 174, which is disposed at line 60, is open. At the start of the off-line cleaning method, valves 128,130 and 174 are closed. Before brush 122 is disposed in line 164, tubular reactor 12 is flushed by directing water at a high velocity through tubular reactor 12 from outlet 156 to inlet 13. In one embodiment, water is directed through tubular reactor 12 at the operating pressure by opening valves 176,166 and 152 are opened. Water is directed from water source 178 through line 180 and valve 176 to projection 158 and tubular reactor 12 by high pressure pump 182. Solids are flushed from tubular reactor 12 by the water through projection 120, line 184 and into collection vessel 186.

Following flushing, at least a portion of remaining deposits of solids in tubular reactor 12 can subsequently be removed by brushing. Valves 166 and 176 are closed and end cap 162 is removed from fitting 160. Brush 122 is inserted into fitting 160 and end cap is returned to fitting 160. Valves 166 and 176 are then reopened, and the brush 122 is directed by the flow of water through projection 158 and tubular reactor 12 to fitting 146 at projection 120. Solids removed by brushing are collected in collection vessel 186, which is equipped with back pressure regulator 188 to maintain a desired pressure in tubular reactor 12 during flushing and brushing.

In the event that very large motive force is required to remove a large deposit of solids, brush 122 can be directed through tubular reactor 12 at relatively high velocity by filling vessel 190 with air and water at a pressure which is significantly higher than that of tubular reactor 12, and then opening valve 192, which is disposed at line 194 extending between vessel 190 and fitting 160. Opening of valve 192 causes expansion of air through valve 192 and forces water in vessel 190 through valve 192. Brush 122, which is disposed in line 164, is thereby swept through tubular reactor 12 at a suitable velocity. An example of a suitable velocity is a velocity in the range of between about ten and about one hundred feet per second.

Examples of suitable materials of construction of bristles of brush 122 include, for example, constructed of Inconel 625, Hastelloy C-276, stainless steel, or nylon. When using the on-line cleaning method, it is preferable to construct the entire brush 122 from the same material used for tubular reactor 12 so as to preserve the integrity of brush 122 at the operating temperature of reaction system 10 in tubular reactor 12. When using the off-line cleaning method, bristle materials should be chosen to provide adequate friction to remove the hardest solid deposits likely to be encountered.

Other means can also be used to remove solids from tubular reactor 12, such as by a high velocity cleaning spray. The cleaning spray can be a suitable material, including, for example, a gas or a liquid from the effluent mixture or some other suitable material at supercritical conditions. The cleaning spray can be delivered by a nozzle, not shown, which is periodically passed through tubular reactor 12. Finely dispersed solids can also be sprayed by a nozzle, either alone or dispersed within a fluid, to remove solids collected within tubular reactor 12. Removal of solids by a brush, spray or by other means can be performed periodically, i.e. about every eight hours of operation. Formation of hardened scale including, for example, sodium sulfates and calcium sulfates, is thereby substantially reduced.

Figure 9:
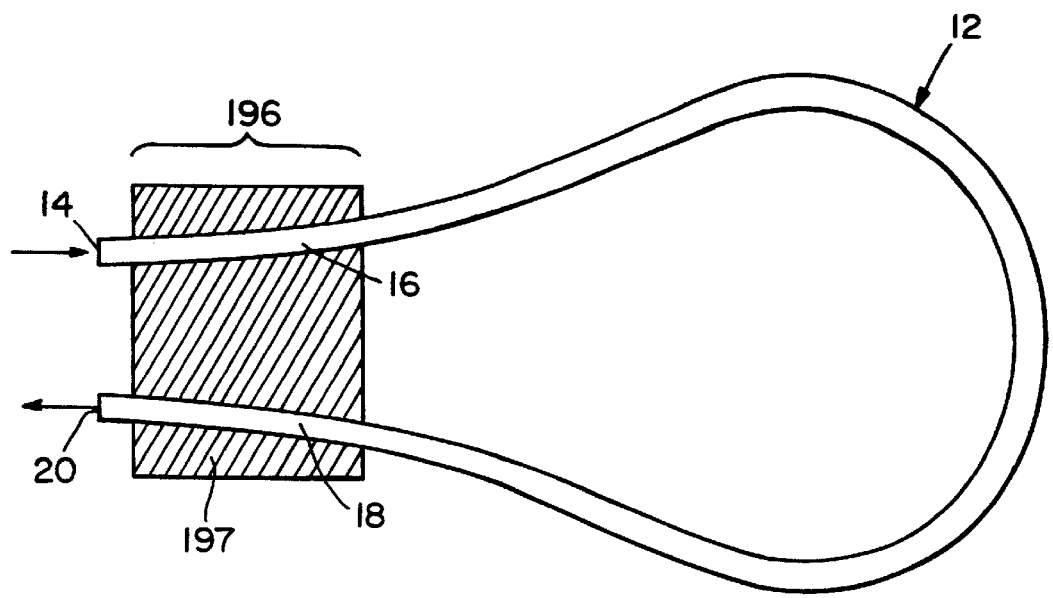
FIG. 9 is a schematic representation illustrating another embodiment of a tubular reactor.

In another embodiment of the invention, shown in FIG. 9, tubular reactor 12 can be dimensioned and configured to form a heat transfer zone 196, defined by inlet end 16 and outlet end 18, wherein inlet end 16 and outlet end 18 are substantially parallel and proximately located. Heat-conducting component 197 is disposed about inlet end 16 and outlet end 18 at heat transfer zone 196. Heat-conducting component 197 conducts heat from outlet end 18 to inlet end 16 for heating of a outlet end 18 and cooling of inlet and 16. An example of a suitable material of construction of heat-conducting component 197 is metal, such as zinc. Heat is conducted from outlet end 18 to inlet end 16 at heat transfer zone 196. The reaction mixture is thereby heated at least in part by heat conducted from the reaction mixture at outlet end 18. The reaction mixture at outlet end 18 is cooled by transfer of heat from outlet end 18 to inlet end 16. Tubular reactor 12 can be insulated to reduce heat loss. Tubular reactor 12 can have a radius of curvature of at least about 20 times that of its internal diameter for substantially reducing deposition of solids by high velocity flow of the reaction mixture or of a cleaning spray.

In still another embodiment of the invention, shown in FIG. 10, tubular reactor 12 can be configured to have straight portions 198,200 and curved portion 202 disposed between straight portions 198,200. Preferably, the radius of curvative at curved portion 202 is at least 20 times that of the internal diameter of tubular reactor 12. Alternatively, tubular reactor 12 can have more than one curved portion.

Jackets 204,206 are disposed at inlet end 16 and outlet end 18 respectively. A heat transfer fluid is recirculated between jackets 204,206 through lines 208,210 by pump 212, which is disposed at line 208. Heat is thereby transferred from outlet end 18 to inlet end 16 for cooling of the reaction mixture at outlet end 18 and for heating of the reaction mixture at inlet end 16. The heat transfer fluid is directed through jackets 204,206 in a direction counter to the direction of flow of the reaction mixture through tubular reactor 12. Alternatively, the heat transfer fluid can be directed through heat exchangers 204,206 in a concurrent direction relative to the flow of the reaction mixture. Insulation 214 is disposed about tubular reactor 12 between jackets 204,206 to reduce heat loss from the reaction mixture.

Examples of suitable heat transfer fluids include water, silicone oil, or some other suitable heat transfer fluid which is substantially stable at the operating temperature of system 10. Preferably, the heat transfer fluid is water which is at a pressure equal to the pressure within tubular reactor 12.

Figure 11:
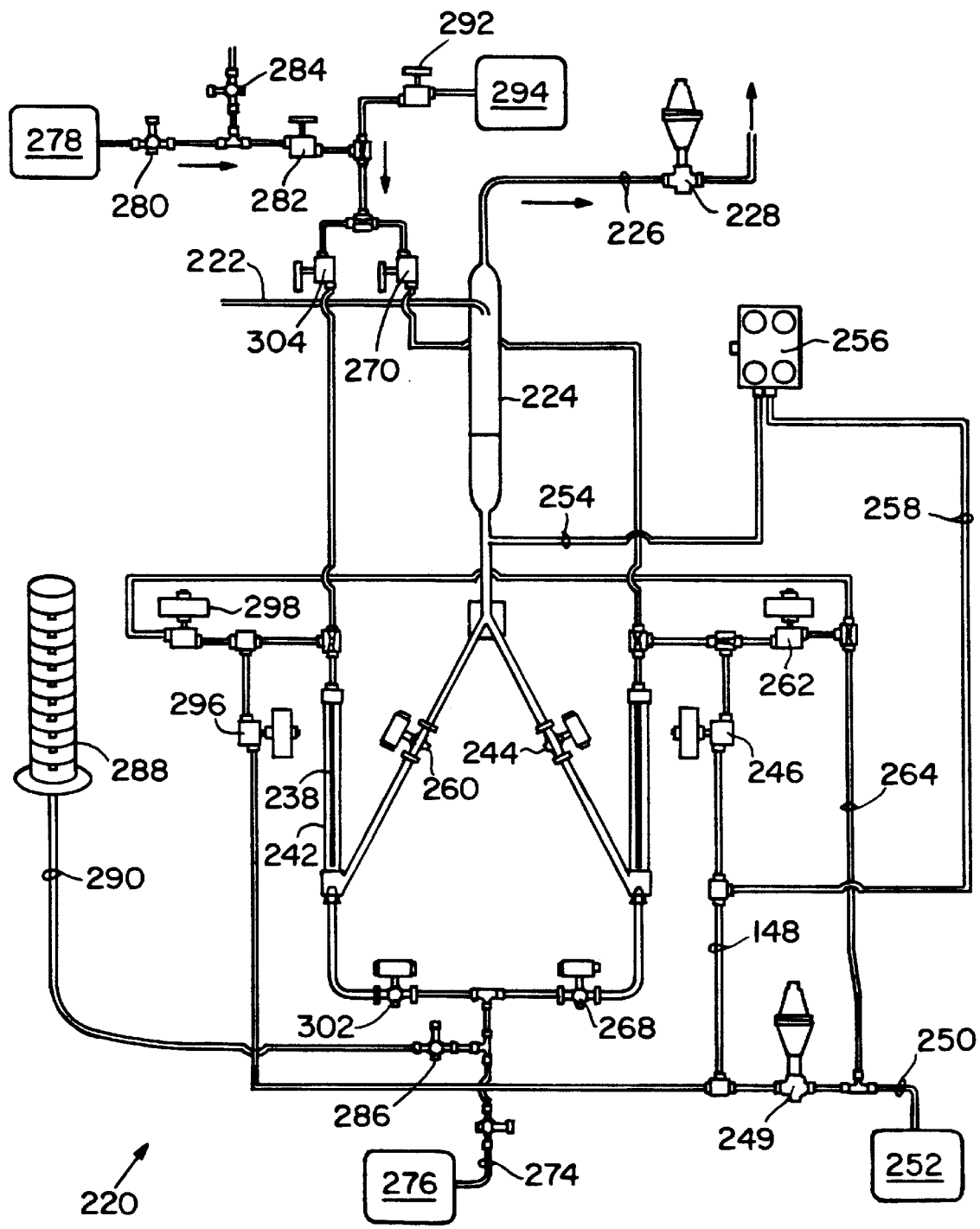
FIG. 11 is a schematic representation of one embodiment of an apparatus for separation of solids from an effluent mixture formed by the method and apparatus of the present invention.

The mixture of solids, liquid and gas of the effluent mixture discharged from tubular reactor 12 can be separated in separation system 220, shown in FIG. 11. Separation system allows separation of the gaseous, liquid and solid effluent components into separate streams prior to depressurization. The resulting solid, liquid and gaseous effluent streams are then depressurized separately, thereby avoiding depressurization of a multi-phase effluent mixture.

The effluent mixture is conducted from a suitable tubular reactor, not shown, through process line 222 to gas/liquid separator 224. Gas within the effluent mixture is separated from liquid and solids in gas/liquid separator 224 and is discharged from gas/liquid separator 224 through gas discharge line 226 and is depressurized to substantially atmospheric pressure at valve 228. Y-fitting 230 conducts solids and liquids from gas/liquid separator 224, through either of two arms 232,234 and filters 236,238 for separation of solids from liquids in the effluent mixture and for collection of those solids and liquids. Arms 232,234 of Y-fitting 230 are dimensioned and configured to conduct solids along a path of flow without blockage by solids within Y-fitting 230. Further, solids settling within either arm, while that arm is not in use, can be discharged from Y-fitting 230 upon reestablishing fluid communication between that arm and its respective filter.

Effluent directed from gas/liquid separator 224 can be conducted through either of two process flow paths. A first flow path includes filter 236 and filter housing 240 and lines associated with conducting liquid and solid effluent to and from filter 236. A second flow path includes filter 238, filter housing 242 and lines associated with conducting liquid and solid effluent to and from filter 238. Within housings 240, 242, liquid comprising water which contains dissolved inorganic salts is separated from solids, including metal oxides, metal carbonates and insoluble inorganic salts at filters 236,238. Filters 236,238 can be formed of porous sintered metal. The sintered metal of filters 236,238 can have a pore size equal to or greater than about 0.1 microns.

With regard to the first flow path, flow of solids and liquid from gas/liquid separator 224 is diverted in Y-fitting 230 through valve 244 to filter housing 240. Liquid and dissolved inorganic solids, including calcium sulfate, sodium chloride, sodium phosphate, sodium carbonate, sodium sulfate, and potassium sulfate, in the effluent mixture which pass through filter 236 are subsequently conducted from filter housing 240 through discharge valve 246, line 248, flow control valve 249 and liquid effluent line 250 to liquid effluent collection tank 252. Solids, including insoluble inorganic salts, transition metals, heavy metals, rare earth metals, metal oxides and metal carbonates, are separated from liquid effluent by collection on filter 236 and can be removed.

Within housing 240, pressure drop across the filter 236 increases with collection of solids on filters 236. The pressure drop across filter 236 is measured by differential pressure transducer 256 through line 254 and line 258. When the pressure differential measured by transducer 256 exceeds about 200 psig, the flow of solids and liquid from the effluent mixture must be diverted to filter 238. Flow of solids and liquid is diverted from the first flow path to the second flow path by opening valve 260 and valve 296 and closing valve 244 and 246. Once flow of the effluent mixture has been diverted to filter 238 in the second flow path, the filter cake on filter 236 can be removed in preparation for subsequent operation.

Solids can be removed from filter 236 by several means. With valves 244, 246, 270 and 268 closed, filter housing 240 and its contents are isolated under pressure. With valves 302 and 286 closed and valve 272 opened, the solid cake on filter 236 can be rapidly depressurized. Carbon dioxide that was dissolved in the liquid in housing 240, evolves from the liquid in the form of a gas during depressurization to form a mixture of liquid and gas. This mixture of liquid and gas rushes back through filter 236, thereby dislodging the solid cake from filter 236. The dislodged solids are swept along with the liquid and gas mixture as the mixture rushes out of housing 240 through valve 268, valve 272, line 274 and into collection vessel 276.

A preferred method for removing solids from filter 236 is as follows. With the closing of valve 244 and valve 246, filter 236 is isolated from the flow of solids and liquids in the effluent mixture. Fluid pressure within the filter 236 is then relieved through valve 262, pressure relief line 264, and valve 266. After filter 236 is depressurized, valve 262 is closed. Valve 268, valve 270, and valve 272 are opened for flushing liquids and solids from filter 236 through valve 272 and line 274 to solids collection tank 276. Air at a pressure of about 200 psig is conducted from air supply 278, through valve 280, valve 282, valve 270 and then through filter 236 to thereby blow or force the solids from filter 236. After solids have been blown off filter 236 by air, valve 280 is closed and valve 284 is opened for venting of air and depressurization of housing 240.

Valve 286 is then opened to direct liquid effluent collected for flushing of the filter housings from effluent washout supply 288 through line 290 and housing 240 to thereby slurry solids separated from filter 236 and collected within housing 240. Solids within housing 240 are dispersed in the washout liquid and are conducted through valve 268 for discharge through solids discharge valve 272 and line 274 for collection in a solids collection tanks 276. Flushing of housing 240 can be repeated until solids have been substantially discharged.

After flushing, housing 240 is filled with liquid from effluent washout supply 288. Valve 284 and valve 286 are then closed, followed by closing of valve 270. Valve 282 and valve 268 are then closed. The housing is subsequently pressurized by opening valve 292 and valve 270 to direct oxygen from oxygen accumulator 294 to the first flow path. When system pressure has been reached in the first flow path, valve 292 is closed. Valve 272 is then closed. Flow of liquid effluent and solids from gas/liquid separator 216 can then be diverted from housing 242 to housing 240 by opening valves 244 and 246 and by closing valves 260 and 296. Liquid effluent is discharged from the separator system through filter 236 and is collected at liquid effluent collection tank 252.

The process of flushing the second flow path is accomplished by the same method as described above for the first flow path. Fluid pressure within filter 238 is relieved through valve 298, lines 300 and 264, and valve 266. Valve 298 is then closed and valves 272, 302 and 304 are opened for flushing liquid and solids from filter 238 through line 274. Air is then used to blow solids from filter 238 in the same manner as was performed for filter 236. Flow of air is then secured and liquid effluent from effluent supply 288 is directed into housing 242 to slurry solids separated from filter 238. Liquid effluent and slurried solids in housing 242 are conducted through valve 302, valve 272 and line 274 for collection in solids collection tank 276. Housing 242 is flushed repeatedly as necessary to clear housing 242 and filter 238 of collected solids.

Housing 242 is subsequently filled with effluent from effluent supply 288 and is pressurized by oxygen accumulator 294 as was executed for the first flow path. The second flow path is then ready for diversion of effluent mixture from the first flow path and the cycle of flushing the first flow path and diversion of flow is repeated for continuous operation of reaction system 10.

The method of the present invention can be used to recover energy in the form of steam from aqueous wastes having heating values of greater than about 400 Btu per pound. In addition, carbon dioxide formed by oxidation of organic materials in the reaction mixture can be separately recovered. For example, when cryogenic oxygen is employed as a source of oxygen to form the reaction mixture, it is possible to recover the carbon dioxide from a gaseous component of the effluent mixture by heat transfer from the gaseous component to the cryogenic oxygen.

Figure 12:
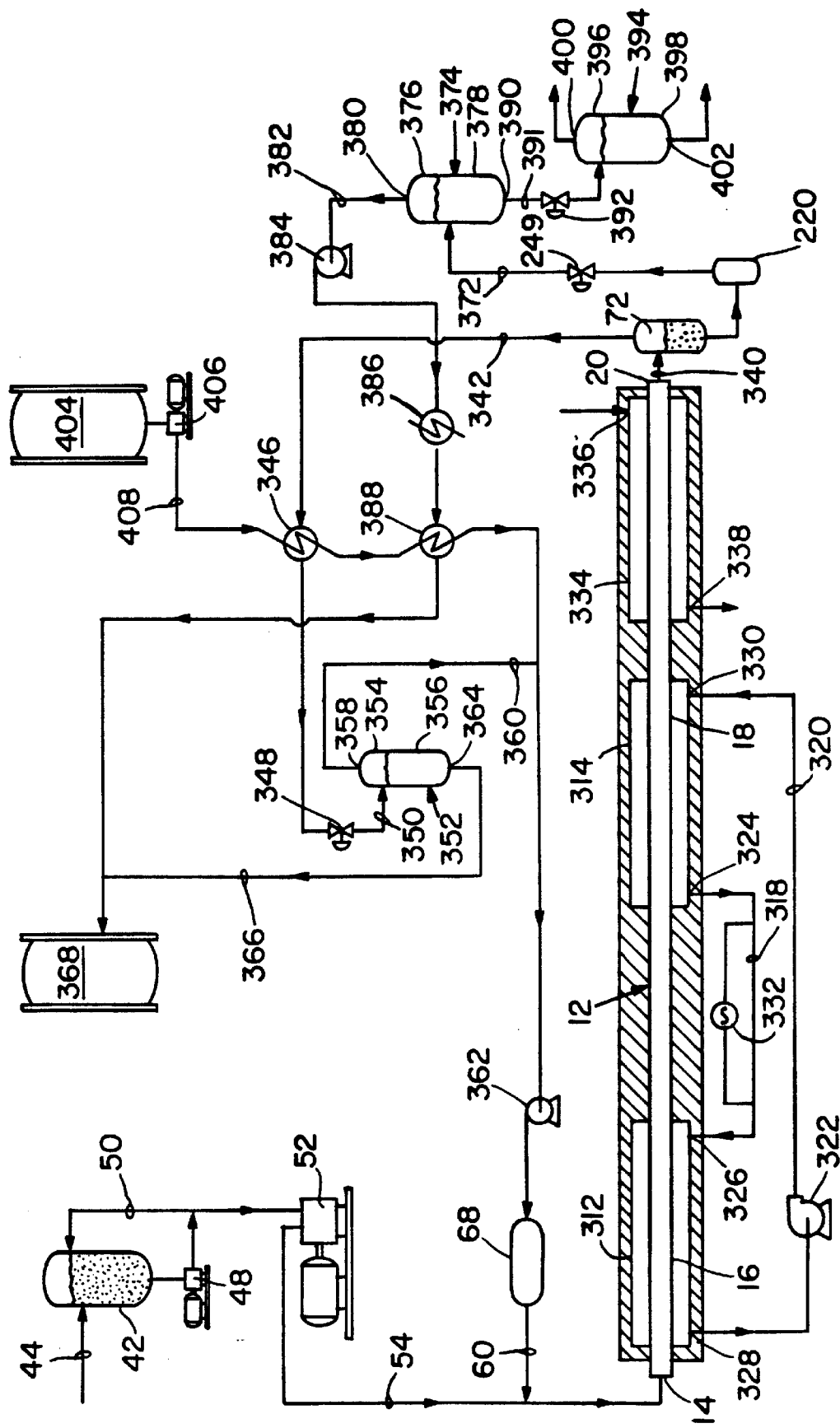
FIG. 12 is a schematic representation of one embodiment of a reaction system incorporating a tubular reactor with a loop for recirculating an external heat transfer fluid, recovery of steam and carbon dioxide from the reaction mixture, and recycle of oxygen recovered from the effluent mixture generated by the method and apparatus of the present invention.

In one embodiment, shown in FIG. 12, reaction system 10 includes recovery system 310. Recovery system 310 includes means for recovering heat energy and carbon dioxide from the effluent mixture generated in reaction system 10. During operation of reaction system 10, waste is directed to feed storage tank 42 through line 44 and recirculated by pump 48 through line 50. A portion of the flow from pump 48 is diverted to high pressure pump 52 and passed to tubular reactor 12 through line 54. A gas which includes oxygen is directed from accumulator 68 through line 60 and is combined with the feed directed through line 54 to form a reaction mixture. The reaction mixture then enters tubular reactor 12 at inlet 14.

Jackets 312,314 are disposed at inlet end 16 and outlet end 18 of tubular reactor 12, respectively.

Jackets 312,314 can be spaced apart so that a portion of tubular reactor 12 is neither heated nor cooled by heat transfer fluid at the heat exchangers. Insulation 316 is disposed about tubular reactor 12.

External heat transfer means include a heat transfer fluid, heating jacket 312, cooling jacket 314, heating recirculating line 318, cooling recirculating line 320 and recirculating pump 322. Heat transfer fluid within cooling jacket 314 is heated by transfer of heat from the reaction mixture to the heat transfer fluid at outlet end 18. The heat-transfer fluid is then removed from cooling jacket 314 through cooling outlet 324 and then conducted through heating recirculating line 318 for entry to heating jacket 312 through heating inlet 326. Heat is transferred from the heat-transfer fluid at inlet end 16 to the reaction mixture to thereby heat the reaction mixture. The heat-transfer fluid is thereby cooled, discharged at heating outlet 328, and then conducted through cooling recirculating line 320 and recirculating pump 322 for return to cooling jacket 314 through cooling inlet 330 and subsequent cooling of the reaction mixture at outlet end 18. If additional energy is desired for heating of the reaction mixture beyond that which is withdrawn at outlet end 18, heating recirculating line 318 can be heated by a suitable means, such as by direct ohmic heating, employing electrical power source 332, which is disposed at heating recirculation line 318. Electrical power source 332 can also be employed for heating of the reaction mixture at inlet end 14 during start-up of system 10.

The reaction mixture exiting heat exchanger 430 can still have considerable potential for power recovery. If the feed mixture has a heating value of about 700 Btu/lb, then the temperature of the reaction mixture discharged from tubular reactor at outlet 20 is typically as high as about 340° C. Thus, jacket 334, disposed at outlet end 18 of tubular reactor 12 can be employed to generate steam by directing pressurized water into jacket 334 through at inlet 336. Steam will be generated from the pressurized water in jacket 334. The steam will be discharged from jacket 334 through outlet 338.

The effluent mixture is cooled in jacket 334. The cooled effluent mixture includes gaseous, liquid and solid components, and is directed through line 340 into gas/liquid separator 72. The gas, liquid and solid phase components separate in gas/liquid separator 72. Typically, a substantial portion of the gas phase component includes oxygen and carbon dioxide. The gas phase component is conducted from gas/liquid separator 72 through line 342 to heat exchanger 346. The gas phase component is cooled to a temperature at a mixture is formed having a carbon dioxide-rich liquid phase and an oxygen-rich gas phase. The temperature to which the gas phase component is cooled is typically in the range of between about −30 and about −50° C. The mixture is then depressurized by directing the mixture through valve 348. The mixture is thereby reduced to a pressure in the range of between about 200 and about 400 psi, and then is conducted through line 350 to gas/liquid separator 352, having an upper portion 354 and a lower portion 356. The oxygen-rich gas phase and the carbon dioxide-rich liquid phase are separated in gas/liquid separator 352. The oxygen-rich gas phase is conducted out of gas/liquid separator 352 through outlet 358 at upper portion 354 and subsequently recycled back to tubular reactor 12 through line 360 by pump 362, which is disposed at line 360. The carbon dioxide-rich liquid phase is conducted out of gas/liquid separator 352 through outlet 364 at lower portion 356 and is directed through line 366 to carbon dioxide storage vessel 368.

The liquid and at least a portion of the solid component of effluent mixture in gas/liquid phase separator 72 is discharged through outlet 86 and line 370 to solid/liquid phase separation system 220, which was described above with reference to FIG. 11. The liquid discharged from solid/liquid phase separation system 220, which is still at about the same pressure as the reaction mixture in tubular reactor 12 and gas/liquid separator 72, is depressurized to a pressure in the range of between about 50 and about 100 psig through valve 249, which results in generation of a mixture having a carbon dioxide-rich gas phase and a liquid phase.

The mixture is directed from valve 249 through line 372 to gas/liquid separator 374, having an upper portion 376 and a lower portion 378. The carbon dioxide-rich phase and liquid phase are separated in gas/liquid separator 374 and the carbon dioxide-rich gas phase is then discharged from gas/liquid separator 374 through outlet 380. The carbon dioxide-rich phase is then directed through line 382 and pressurized by compressor 384, which is disposed at line 382, to a pressure in the range of between about 200 and about 400 psig. The compressed carbon dioxide-rich gas phase is then cooled in heat exchanger 386 to a temperature of about 35° C. and then directed to heat exchanger 388 to thereby condense the carbon dioxide-rich gas phase and form a carbon dioxide-rich liquid phase in heat exchanger 388. The carbon dioxide-rich liquid phase is then directed to carbon dioxide storage vessel 368.

The liquid phase in gas/liquid phase separator 374 is discharged form gas/liquid separator 374 though outlet 390 at lower portion 378. The liquid phase is then depressurized to about atmospheric pressure at valve 392. A mixture is formed by depressurization which includes a residual carbon dioxide-rich gas phase and a liquid phase. The mixture is directed through line 391 to gas/liquid phase separator 394, having upper portion 396 and lower portion 398. The gas and liquid phases of the mixture separate in gas/liquid phase separator 394. The gas phase is discharged to the atmosphere through outlet 400 at upper portion 396. The liquid phase is discharged from gas/liquid phase separator 394 through outlet 402 at lower portion 398.

Oxygen from storage vessel 404 is pressurized by compressor pump 406 to a pressure in the range of between about 200 and about 400 psig, and then directed by compressor pump 406 through line 408 and heat exchangers 346 and 388 and mixed with the oxygen-rich gas phase in line 360. The combined oxygen gas streams are then pressurized by compressor 362 and stored in accumulator 68 for introduction to tubular reactor 12 through line 60.

The invention will now be further and specifically described by the following examples. All parts and percentages are by weight unless otherwise specified.

EXAMPLE I

A reaction system was set up as shown in FIG. 1. The reactor included a ⅛ inch, schedule 40 pipe formed of Alloy 625. The reactor was about 40 feet long and was constructed by joining sections of pipe with butt weld and screw fitting unions that maintained within the reactor a smooth bore. Fluids, including the feed mixture and the effluent stream, were at ambient temperature upon entering and leaving the reactor.

Activated sewage sludge was fed to the reaction system at about 40 ml/min. Table I lists the components of the activated sewage sludge prior to treatment by the method and apparatus of the present invention and following treatment at reaction conditions, which conditions varied according to the maximum reaction temperature within the reaction. The operating conditions for three reaction runs, Run A, Run B and Run C, are shown in Table I. The maximum reaction temperatures in the tubular reactor for Run A, Run B and Run C were 363° C., 390° C. and 463° C., respectively. The pH of the raw sludge was about 7. The pH of the aqueous phase of the effluent for all three runs was about 8.

The analytical results of tests listed in Table I for the raw sludge and the reaction mixture discharged from the tubular reactor are shown in units of milligrams of component, such as total organic carbon (hereinafter "TOC") content, per liter of raw sludge or per liter of reaction mixture.

TABLE I

COMPOSITIONS OF RAW SEWAGE SLUDGE
AND SEWAGE EFFLUENTS
ANALYTICAL RESULTS (mg/l)

| Analytical Test | Raw Sludge | Run A 363° C. | Run B 390° C. | Run C 463° C. |
|---|---|---|---|---|
| TOC | 5006 | 1024 | 419 | 92 |
| TOC reduction (%) | | 80 | 92 | 98 |
| NO3-N | 1 | 0 | 0 | 15 |
| NH3-N | 102 | 508 | 436 | 141 |
| Total N | ~750 | 598 | 461 | 147 |
| N reduction (%) | | 20 | 39 | 80 |
| pH | 6.98 | 8.01 | 8.06 | 8.00 |
| Volatile acids | | | | |
| Formic acid | ND | 144 | 22 | 3 |
| Acetic acid | ND | 2050 | 844 | 244 |
| Metals | | | | |
| Arsenic | 0.05 | 0.01 | 0.00 | |

TABLE I-continued

COMPOSITIONS OF RAW SEWAGE SLUDGE
AND SEWAGE EFFLUENTS
ANALYTICAL RESULTS (mg/l)

| Analytical Test | Raw Sludge | Run A 363° C. | Run B 390° C. | Run C 463° C. |
|---|---|---|---|---|
| Aluminum | 45.00 | 0.11 | 0.18 | |
| Barium | 10.00 | 0.43 | 0.14 | |
| Boron | 0.41 | 1.20 | 0.45 | |
| Cadmium | 0.88 | 0.25 | 0.06 | |
| Calcium | 238.00 | 171.00 | 47.00 | |
| Chromium +6 | <0.04 | ND | 0.11 | |
| Chromium | 4.80 | 0.29 | 0.10 | |
| Copper | 4.30 | 2.30 | 0.64 | |
| Gold | 0.00 | 0.03 | 0.01 | |
| Iron | 174.00 | 0.13 | 0.10 | |
| Lead | 0.91 | ND | ND | |
| Magnesium | 52.00 | 2.80 | 1.50 | |
| Manganese | 4.90 | 0.44 | 0.13 | |
| Mercury | 0.00 | 0.00 | 0.04 | |
| Nickel | 1.10 | 0.04 | 0.04 | |
| Phosphorus | 244.00 | 6.40 | 2.70 | |
| Potassium | 70.00 | 36.00 | 33.00 | |
| Selenium | 0.02 | 0.07 | 0.03 | |
| Silicon | 115.00 | 159.00 | 74.00 | |
| Silver | 0.79 | 1.50 | 0.50 | |
| Strontium | 2.20 | 1.50 | 0.38 | |
| Zinc | 21.00 | 3.10 | 1.30 | |

As can be seen from Table I, the aqueous phase of the effluent stream contained substantially reduced amounts of TOC and nitrogen content in all of the runs relative to their concentration in the raw sludge. Further, the percent reduction of TOC and of nitrogen relative to the TOC content and the nitrogen content of the raw sludge was also significantly increased with increased maximum reaction temperature.

EXAMPLE II

A mixture was prepared of low-level radioactive waste, such as that generated during production of nuclear weapons, was fed to the reaction system described in Example I. Table II is a list of components of the mixture and their weight percent makeup as received in the reaction system, following neutralization, after dilution to form a feed mixture, and of aqueous and solid components of the effluent mixture discharged from the reaction system.

TABLE II

| SUBSTANCE | (A) As rec'd Wt (%) | (B) Neutralized Wt (gm) | (C) Feed Dilute Wt (gm) | (D) Aq. Effluent Wt (gm) | (E) Solid Effluent Wt (gm) |
|---|---|---|---|---|---|
| Water | 55.78 | 59.488 | 2,552.5 | 2,556.1 | |
| Alkali Salts | 22.998 | 43.825 | 43.8 | 47.3 | |
| Potassium Nitrate | 0.230 | 21.057 | | | |
| Sodium Dihydrogen Phosphate | 0.130 | 0.130 | | | |
| Sodium Chloride | 0.118 | 0.118 | | | |
| Borax | 0.209 | 0.209 | | | |
| Sodium Nitrate | 17.081 | 17.081 | | | |
| Sodium Carbonate | 5.230 | 5.230 | | | |
| Nitric Acid | 12.959 | 0 | 0 | 0 | |
| Other Metal Salts | 2.322 | 2.322 | 2.3 | 0 | 0.716 |
| Ferric Nitrate (Fe$_2$O$_3$) | 0.478 | | | | .158 |
| Aluminum Nitrate (Al$_2$O$_3$) | 1.471 | | | | .352 |
| Calcium Nitrate | 0.162 | | | | .099 |

TABLE II-continued

| SUBSTANCE | (A) As rec'd Wt (%) | (B) Neutra- lized Wt (gm) | (C) Feed Dilute Wt (gm) | (D) Aq. Effluent Wt (gm) | (E) Solid Effluent Wt (gm) |
|---|---|---|---|---|---|
| (CaCO$_3$) | | | | | |
| Rare Earth Nitrate* (M$_2$CO$_3$) | 0.0165 | | | | .00332 |
| Magnesium Nitrate (MgCO$_3$) | 0.124 | | | | .070 |
| Manganous Nitrate (MnO$_2$) | 0.064 | | | | .031 |
| Zinc Acetate (ZnO$_4$) | 0.006 | | | | .003 |
| Organic Compounds** | 5.945 | 5.945 | 5.9 | 0 | |
| Trisodium Heta | 4.300 | | | | |
| Trisodium Citrate | 0.821 | | | | |
| Tetrasodium EDTA | 0.671 | | | | |
| Oxalic Acid | 0.153 | | | | |
| | | 111.58 | 2,604.6 | 2,603.4 | |

*Rare Earth Conc = 74 ppm
**Total Organic Carbon = 19,250 ppm

As can be seen in Table II, alkali salts were substantially dissolved in the aqueous effluent while other metal salts were substantially removed as solid effluents. Nitric acid and organic compounds were essentially destroyed by the reaction system.

EXAMPLE III

Samples of pulp mill sludge having a 7.2% solids content were macerated using coarse and medium heads of a bench scale in-line wet macerator. The sludge samples were then diluted with deionized water and homogenized using a fine head on the macerator. The particle size of the sludge samples after maceration was less than 100 microns. The sludge samples were then diluted in water to 3.7% by weight.

The sludge samples were then separately fed to the reaction system illustrated in FIG. 1 and described in Examples I and II. Each sludge sample was pressurized to 3700 psi and fed to the tubular reactor. Two runs were conducted through the reaction system using the macerated pulp mill sludge. A third run was conducted employing a dioxin, 2,3,7,8-tetra-chlorodibenzo dioxin (hereinafter "TCDD"), dissolved in a solvent containing 1.7% (by volume?) methyl ethyl ketone in deionized water to form a feed solution having a TCDD content of 0.5 ppm. Run conditions for the three runs is listed below in Table III.

TABLE III

| Run | Feed | Duration (hr) | Feed Flowrate (cc/min) | Oxygen Flowrate (SCFM) | Peak Reactor Temperature (° C.) |
|---|---|---|---|---|---|
| 1 | Sludge | 5.25 | 67 | 0.19 | 590 |
| 2 | Sludge | 6.8 | 71 | 0.19 | 574 |
| 3 | Dioxin | 2.3 | 52 | 0.19 | 574 |

The test results of the first two runs is shown below in Table IV.

TABLE IV

| | RUN 1 | | | | RUN 2 | | | |
|---|---|---|---|---|---|---|---|---|
| ANALYTICAL TEST | Sludge | Aqueous | Solids | Destruc- tion (R) | Sludge | Aqueous | Solids | Destruc- tion (%) |
| Total solids | 36,100 | NA | 4,300 | 88 | 43,900 | NA | 8,900 | 80 |
| 2, 3, 7, 8-ECDD (pg/g) | 0.34 | 0.0031 | 1.9 | 96.7 | 123 | ND(.02) | 2.9 | 99.98 |
| 2, 3, 7, 8-TCDF (pg/g) | 1.58 | ND(.0027) | 5.3 | >98.4 | 834 | ND(.01) | 25.6 | 99.97 |
| MAJOR ELEMENTS | | | | | | | | |
| Carbon | 12,043 | 27 | 18,500 | 99.1 | 18,362 | 16 | 11,000 | 99.3 |
| Oxygen | 11,545 | NA | 51,800 | 98.1 | 13,109 | NA | 35,600 | 97.8 |
| Hydrogen | 1,563 | NA | 10,250 | 97.2 | 1,664 | NA | 5,300 | 97.2 |
| CHO - SUBTOTALS | 25,151 | 27 | 80,550 | 98.5 | 31,134 | 16 | 51,900 | 98.5 |

| | Sludge | Aqueous | Solids | Recovery (%) | Sludge | Aqueous | Solids | Recovery (%) |
|---|---|---|---|---|---|---|---|---|
| MINOR ELEMENTS | | | | | | | | |
| Aluminum | 132 | 5 | 63,600 | 211 | 281 | 7 | 36,100 | 117 |
| Calcium | 678 | 258 | 29,500 | 55 | 474 | 480 | 8,380 | 108 |
| Chlorine | 329 | 188 | 248 | 55 | 208 | 210 | 125 | 97 |
| Iron | 25 | ND | 3,590 | 61 | 229 | 0 | 18,000 | 70 |
| Magnesium | 40 | 1 | 3,240 | 37 | 32 | 3 | 2,320 | 74 |
| Manganese | 20 | 1 | 1,440 | 34 | 6 | 0 | 355 | 68 |
| Nitrogen | 217 | 187 | 148 | 84 | 145 | 18 | 187 | 13 |
| Phosphorus | 17 | 1 | 10 | 8 | 25 | 1 | 188 | 10 |
| Potassium | ND | 8.7 | 2,270 | | ND | 12 | 1,900 | |
| Silicon | 40 | 73 | 196 | 181 | 74 | 160 | 867 | 218 |
| Sodium | 148 | 103 | 9,960 | 97 | 68 | 77 | 2,090 | 137 |
| Sulphur | 159 | 105 | 0 | 64 | 417 | 413 | 2 | 95 |
| MINOR - SUBTOTALS | 1,803 | 927 | 114,199 | 77 | 1,958 | 1,383 | 70,512 | 99 |

TABLE IV-continued

| | | | | | | | | |
|---|---|---|---|---|---|---|---|---|
| Distribution | | 50% | 27% | | | 67% | 32% | |
| TRACE ELEMENTS | | | | | | | | |
| Arsenic | ND | 0.008 | ND | | 0.24 | 0.019 | 37 | 145 |
| Barium | 2 | 0.21 | 147 | 44 | ND | 0.06 | 210 | |
| Boron | ND | 0.31 | 1.6 | | ND | 0.22 | 1.4 | |
| Cadmium | ND | ND | 0.4 | | ND | 0.01 | 1.0 | |
| Chromium | 1.0 | 0.89 | 206 | 177 | 4.5 | 0.11 | 355 | 73 |
| Copper | 1.4 | 0.06 | 59 | 22 | 1.6 | 0.39 | 100 | 79 |
| Lead | ND | ND | 20 | | ND | ND | 27 | |
| Mercury | ND | ND | 0.60 | | 0.01 | 0.0023 | 0.70 | 84 |
| Nickel | 1.8 | 0.05 | 182 | 46 | 2.3 | 0.40 | 410 | 175 |
| Selenium | ND | ND | ND | | ND | 0.01 | 1.8 | |
| Silver | ND | ND | 1.1 | | 0.06 | ND | 2.1 | 23 |
| Strontium | 1.0 | 0.31 | 62 | 57 | 0.9 | 0.90 | 40 | 138 |
| Zinc | 5.6 | 0.26 | 296 | 26 | 7.2 | 0.55 | 488 | 68 |
| TRACE - SUBTOTALS | 13 | 2 | 975 | 48 | 17 | 3 | 1,674 | 104 |
| Distribution | | | 16% | 33% | | | 15% | 89% |

The concentration of total solids trace elements are shown in units of milligrams of element per kilograms of sludge, (i.e. wet basis), which is equivalent to parts per million by weight (ppm). TCDD and TCDF concentrations are shown in units of picograms per gram of sludge (wet basis), which is equivalent to parts per trillion (ppt). The analysis of major, minor and trace elements are presented on a dry basis.

The sludges of the first and second runs have solids contents of 3.6% and 4.4% by weight, respectively. The three major elements, carbon, hydrogen, and oxygen, account for more than 70% by weight of the sludge solids. The twelve minor elements account for an additional 5% and the thirteen trace elements account for about 0.5% of the sludge solids. The remaining 25% of the sludge solids are presumed to include about 80 elements which were not tested for. A gas chromatographic analysis of the gaseous effluent indicated the presence of only oxygen and carbon dioxide.

Destruction efficiency of the organic material fed to the reaction system is a measurement of the amount of elemental carbon, hydrogen or oxygen detected in a sample of solid effluent and aqueous effluent produced by the reaction system compared to the compounds which comprise the sludge samples introduced to the reaction system. As can be seen from Table, IV, the destruction efficiencies of carbon for both paper mill sludge samples was greater than 99%. The destruction efficiencies of oxygen and hydrogen of both paper mill sludge samples was greater than 97%.

Destruction efficiencies were also calculated for organic halies, TCDD and 2,3,7,8-tetrachlorobenzofuran (hereinafter "TCDF") of the sludge samples. Destruction efficiencies for TCDD and TCDF are also listed in Table IV. The combined destruction efficiency for organic halides in both sludge samples was 99.94%

The destruction efficiencies of 2,3,7,8-TCDD and or organic carbon in the dioxin solution were also calculated based on the feed station and the aqueous and solid effluent. The destruction efficiency of the TCDD was 99.99995%.

The solid effluents of the paper mill sludge samples were leached with mild acids and the extract recovered and was analyzed for pollutants that might be leached out by, for example, acidic rainwater. The concentration of pollutants analyzed are listed below in Table V.

TABLE V

| Pollutant | Micrograms per liter of effluent |
|---|---|
| Arsenic | <5. |
| Benzene | 370. |
| Benzo(a)pyrene | <2.5 |
| Bis(2-ethylhexyl)phthalate | 25. |
| Cadmium | 10. |
| Chlordane | <0.25 |
| Copper | 140. |
| DDT/DDE/DDD (total) | <7.5 |
| Lead | 80. |
| Lindane | <0.25 |
| Mercury | <.5 |
| Nickel | <50. |
| Polychlorinated biphenyls | <2.5 |
| Toxaphene | <0.25 |
| Trichlorethane | <1.9 |

With respect to aqueous effluent, the total concentrations of chlorine (as chloride ion), nitrogen (as ammonia), sodium and sulfur (as sulfate) was about 0.1 weight percent.

With regard to the test results for the solution of TCDD in methyl ethyl ketone, the concentration of TCDD in the effluent was 264 picograms per liter of effluent. This was equivalent to a destruction efficiency of greater than 99.9999%. The total organic carbon destruction efficiency was about 99.9%, which was consistent with the values obtained for the two sludge samples.

EXAMPLE IV

Chemical surrogates for chemical warfare agents were fed to the reaction system illustrated in FIG. 1, and described in Examples I, II, and III, above. The chemical surrogates were selected for chemical warfare agents "HD," "GB," and "VX." The chemical formulas for these chemical warfare agents and their corresponding chemical surrogates are listed below in Table VI.

TABLE VI

| Agent | Chemical Name | Empirical Formula | Selected Surrogates |
|---|---|---|---|
| HD | bis(2-chloro-ethyl) sulfide | $C_4H_8Cl_2S$ | 1) 1,5 Dichloropentane $C_5H_{10}Cl_2$ |

TABLE VI-continued

| Agent | Chemical Name | Empirical Formula | Selected Surrogates |
|---|---|---|---|
| GB | Isopropyl methyl phosphonofluoridate | $C_4H_{10}FO_2P$ | 2) Ethyl-2-hydroxyethyl sulfide $C_2H_5\text{-}S\text{-}C_2H_4\text{—}OH$ <br> 1) Diethyl methyl phosphonate $CH_3PO(OC_2H_5)_2$ <br> 2) 4-fluorobenzyl alcohol $C_6H_4F(CHO)$ |
| VX | O-ethyl-S-(2-di-isopropylamino ethyl) methyl phosphonothiolate | $C_{11}H_{26}NO_2PS$ | 1) Diethyl methyl phosphonate $CH_3PO(OC_2H_5)_2$ <br> 2) N,N-Diisopropyl aminoethanol $C_2H_4(OH)N(C_3H_7)_2$ |

The conditions for the reaction system and destruction efficiences for each run are listed below in Table VII.

TABLE VII

| Run | Agent Simulated | Concentration (wt-%) | Effluent pH[1] | Duration (hr) | Feed Flow rate (cc/min) | Oxygen Flow rate (scfm) | Reactor Temperature (C.) | Residence Time (min) | Surrogate Destruction Efficiency (%) |
|---|---|---|---|---|---|---|---|---|---|
| 1 | HD | 2.0 | 0.5 | 0.6 | 100 | 0.150 | 530 | 2.7 | — |
| 2 | HD | 2.0 | 0.5 | 3 | 21.0 | 0.151 | 574 | 7.8 | 99.996 |
| 3 | HD | 0.25 | 1.4 | 2 | 69.3 | 0.125 | 579 | 3.2 | 99.997 |
| 4 | HD | 0.25 | 1.4 | 1.5 | 70.1 | 0.150 | 524 | 3.3 | 99.9997 |
| 5 | GB | 2.0 | 0.6 | 4.5 | 22.7 | 0.133 | 563 | 7.9 | 99.99992 |
| 6 | GB | 1.0 | 0.9 | 2 | 71.1 | 0.151 | 550 | 3.4 | 99.998 |
| 7 | GB | 1.0 | 0.9 | 1.5 | 70.3 | 0.151 | 417 | 2.5 | 99.9993 |
| 11 | GB | 1.0 | 0.9 | 1.5 | 73.3 | 0.216 | 645 | 3.1 | 99.99998 |
| 8 | VX | 1.0 | 0.9 | 4.5 | 22.0 | 0.176 | 562 | 5.9 | 99.999 |
| 9 | VX | 1.0 | 0.9 | 1.5 | 70.3 | 0.175 | 576 | 2.7 | 99.9996 |
| 10 | VX | 1.0 | 0.9 | 1.5 | 70.0 | 0.176 | 514 | 2.2 | 99.9996 |

[1]Effluent pH calculated assuming complete conversion of heteroatoms to their corresponding acids.

The chemical surrogates were selected, in part, on the basis of chemical similarity to the actual agents. A series of destruction tests were run wherein surrogates of HD, GB, and VX were fed to the reaction system. For each run, the feed included an equal mixture of the two selected surrogate chemicals for one of the three chemical agents.

For example, in Run 1, the feed included a mixture of one percent, 1,5-dichloropentane and one percent ethyl-2-hydroxyethylsulfide. Each feed mixture included 0.15 weight percent of Triton X 100, a common surfactant. The surfactant was used to solubilize the surrogates in water. In addition, the feed mixture of Run 11 included three weight percent methyl ethyl ketone in order to increase the heating value of the feed, thereby allowing the reaction temperature in the reaction system to approximate 650° C.

Destruction efficiences were calculated for the chemical surrogates for each run. As can be seen in Table VII, destruction efficiencies of the chemical surrogates in all runs exceeded 99.96 percent. In Runs 3,4,5,8,9,10 and 11, the destruction efficiencies exceeded 99.999%.

What is claimed is:

1. Apparatus for oxidizing organic material in the presence of inorganic material and water, comprising:
    a) a substantially straight elongate tubular reactor having a substantially constant internal diameter from an inlet, of an inlet end of the elongate tubular reactor, to an outlet, of an outlet end of the elongate tubular reactor;
    b) means for forming a pressurized reaction mixture of organic material, inorganic material, water and a source of oxygen, said pressurized reaction mixture having a pressure which is supercritical for water;
    c) means for passing said pressurized reaction mixture through said elongate tubular reactor at a velocity sufficient to prevent settling of a substantial portion of solid particles from the reaction mixture within the elongate tubular reactor;
    d) means for introducing sufficient heat to the pressurized reaction mixture in the elongate tubular reactor to cause at least a substantial portion of the organic material in the reaction mixture to oxidize, the temperature of the reaction mixture being elevated to at least supercritical temperature for water;
    e) means for cooling the reaction mixture within the elongate tubular reactor, but at the outlet end of said elongate tubular reactor, to a temperature sufficient to cause formation of gas and liquid phases in the reaction mixture, the liquid phase including solid particles; and
    an external heat transfer means for transfer of heat from the reaction mixture at the outlet end of the elongate tubular reactor and for transferring heat removed therefrom to the reaction mixture at the inlet end of said elongate tubular reactor, thereby heating the reaction mixture at the inlet end of the elongate tubular reactor wherein the means for heating and cooling the reaction mixture include,
    i) a tube-in-tube heat exchanger disposed at the inlet end,
    ii) a tube-in-tube heat exchanger at the outlet end,
    iii) a heat-transfer fluid disposed in the tube-in-tube heat exchangers, and
    iv) means for recirculating the heat-transfer fluid between said tube-in-tube heat exchangers.

2. An apparatus of claim 1, further including means for cleaning the elongate tubular reactor.

3. An apparatus of claim 2, wherein the means for cleaning said elongate tubular reactor includes a cylindrically-shared brush capable of passing through the length of the elongate tubular reactor.

4. An apparatus of claim 3, wherein the means for cleaning said elongate tubular reactor further includes a high-velocity cleaning spray which can be directed through the length of the elongate tubular reactor.

5. An apparatus of claim 4 further including a solid/liquid separator for separating solids from an effluent mixture after said effluent mixture has been discharged from the elongate tubular reactor.

6. An apparatus of claim 5, further including a Y-fitting for conducting solids and liquids from the gas/liquid separator through either of the two arms of said Y-fitting, wherein the direction of flow of solids and liquids from the gas/liquid separator can be alternated while continuing to receive the effluent mixture discharged from the elongate tubular reactor.

7. An apparatus of claim 6, wherein the solid/liquid separator includes a filter for substantially separating solid particles from said effluent mixture prior to depressurizing the effluent mixture.

8. An apparatus of claim 7, wherein the elongate tubular reactor has a length in the range of between about two hundred and about three thousand feet.

9. An apparatus of claim 8, wherein the elongate tubular reactor includes Inconel 625.

* * * * *